United States Patent
Ying

(10) Patent No.: US 10,939,413 B2
(45) Date of Patent: Mar. 2, 2021

(54) COMMUNICATION METHOD AND RELATED APPARATUS

(71) Applicant: HUAWEI TECHNOLOGIES CO., LTD., Shenzhen (CN)

(72) Inventor: Jiangwei Ying, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/880,540

(22) Filed: Jan. 26, 2018

(65) Prior Publication Data
US 2018/0167913 A1  Jun. 14, 2018

Related U.S. Application Data

(63) Continuation of application No. PCT/CN2015/085890, filed on Jul. 31, 2015.

(51) Int. Cl.
*H04W 72/04* (2009.01)
*H04W 12/04* (2009.01)
(Continued)

(52) U.S. Cl.
CPC .......... *H04W 72/04* (2013.01); *H04L 67/12* (2013.01); *H04W 4/021* (2013.01); *H04W 4/40* (2018.02);
(Continued)

(58) Field of Classification Search
CPC ..... H04W 72/04; H04W 12/04; H04W 88/02; H04W 76/10; H04W 8/02; H04L 67/12
See application file for complete search history.

(56) References Cited

U.S. PATENT DOCUMENTS

2012/0034876 A1  2/2012  Nakamura et al.
2013/0182844 A1* 7/2013  Nagai ................... H04L 9/16
                                                        380/259
(Continued)

FOREIGN PATENT DOCUMENTS

CN  101136826 A  3/2008
CN  102577227 A  7/2012
(Continued)

OTHER PUBLICATIONS

3GPP TS 23.401 V13.3.0 (Jun. 2015); 3rd Generation Partnership Project; Technical Specification Group Services and System Aspects; General Packet Radio Service (GPRS) enhancements for Evolved Universal Terrestrial Radio Access Network (E-UTRAN) access (Release 13), pp. 98-109 (Year: 2015).*
(Continued)

*Primary Examiner* — Walli Z Butt
*Assistant Examiner* — Thad N Defauw
(74) *Attorney, Agent, or Firm* — Kilpatrick Townsend & Stockton LLP

(57) ABSTRACT

A communication method and a related apparatus are disclosed. The method is performed by an MME, including: receiving an attach request message from an eNB, where the attach request message is used to request to attach to a network, and the attach request message includes an identity of the UE; sending, to an HSS according to the attach request message, an authentication data request message including the identity of the UE; receiving an authentication data response message including an AV from the HSS, where the authentication data response message is used to indicate that the authorization on the UE succeeds; and determining, according to the authentication data response message, that the UE is allowed to perform a V2X service, and performing authentication on the UE according to the AV. The method
(Continued)

| Packet header | Message content | Certificate | Signature | can enable a network side to perform authentication on UE during V2V communication, thereby reducing an air-interface resource overhead.

16 Claims, 14 Drawing Sheets

(51) Int. Cl.
*H04L 29/08* (2006.01)
*H04W 76/10* (2018.01)
*H04W 8/02* (2009.01)
*H04W 12/06* (2021.01)
*H04W 4/40* (2018.01)
*H04W 4/021* (2018.01)
*H04W 8/06* (2009.01)
*H04W 12/00* (2021.01)
*H04W 88/02* (2009.01)

(52) U.S. Cl.
CPC ............ *H04W 8/06* (2013.01); *H04W 12/04* (2013.01); *H04W 12/06* (2013.01); *H04W 76/10* (2018.02); *H04W 8/02* (2013.01); *H04W 12/00503* (2019.01); *H04W 88/02* (2013.01)

(56) References Cited

U.S. PATENT DOCUMENTS

| | | | |
|---|---|---|---|
| 2013/0324114 A1 | 12/2013 | Raghothaman et al. | |
| 2014/0162643 A1* | 6/2014 | Lee | H04W 4/80 455/435.1 |
| 2014/0349579 A1 | 11/2014 | Zhou et al. | |
| 2015/0172037 A1 | 6/2015 | Morita | |
| 2018/0035276 A1* | 2/2018 | Kang | H04W 72/02 |
| 2019/0150046 A1* | 5/2019 | Shiga | H04W 84/06 370/331 |

FOREIGN PATENT DOCUMENTS

| | | |
|---|---|---|
| CN | 103209412 A | 7/2013 |
| CN | 103379654 A | 10/2013 |
| CN | 103459234 A | 12/2013 |
| CN | 103546984 A | 1/2014 |
| JP | 2012037940 A | 2/2012 |
| JP | 2015521455 A | 7/2015 |
| WO | 2014011008 A1 | 1/2014 |
| WO | 201403 4572 A1 | 3/2014 |

OTHER PUBLICATIONS

"Authenticaion of sender UE for V2X broadcast communication", Pinheiro et al, Intel Corporation, 3GPP TSG-SA WG1 Meeting #70 S1-151089, San Jose Del Cabo, Mexico, Apr. 13-17, 2015 (Year: 2015).*
S1-150153 ETRI,"New Study Item Proposal: Feasibility Study on V2X over LTE", 3GPP TSG-SA WG1 Meeting #69, Sanya, P.R. China Feb. 2-6, 2015,total 5 pages.
3GPP TS 23.401 V13.3.0 (Jun. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 324 pages.
Huawei et al.,"V2V: MNO role for Security Operation of V2V Service",3GPP TSG-SA WG1 Meeting #70 51-151343, (revision of S1-151169),Los Cabos, Mexico; Apr. 13-17, 2015,total 4 pages.
Intel Corporation,"Authentication of sender UE for V2X broadcast communication",3GPP TSG-SA WG1 Meeting #70 S1-151089,San Jose Del Cabo, Mexico, Apr. 13-17, 2015,total 6 pages.

\* cited by examiner

| Packet header | Message content | Certificate | Signature |

COMMUNICATION METHOD AND RELATED APPARATUS

CROSS-REFERENCE TO RELATED APPLICATIONS

This application is a continuation of International Application No. PCT/CN2015/085890, filed on Jul. 31, 2015, which is hereby incorporated by reference in their entireties.

TECHNICAL FIELD

The present invention relates to the field of communications technologies, and in particular, to a communication method and a related apparatus.

BACKGROUND

A vehicle network has drawn increasing attention from people in recent years. Safety, reliability, and efficiency of road traffic are improved by means of vehicle-to-vehicle communication or vehicle-to-roadside unit (RSU) communication. An objective of an intelligent transport system is to implement continuous vehicle-to-vehicle, vehicle-to-person, and vehicle-to-road communication to exchange a current status of a vehicle or a surrounding environment, so as to reduce traffic accidents, improve traffic safety, help mitigate traffic jams, reduce energy consumption, reduce pollution emission, protect an environment, improve transport efficiency, and boost related industries.

At present, in ITSs (intelligent transport system) of Europe and the US, vehicle-to-vehicle communication is implemented based on a DSRC (dedicated short range communications) technology. A corresponding safety solution is a certificate based on an asymmetric key. Each DSRC message needs to carry a certificate and a message signature.

UE (user equipment) requests to obtain a certificate from a network-side CA (certificate authority). After obtaining the certificate, the UE locally caches the certificate. The UE broadcasts a message to a surrounding vehicle at a frequency of 1-10 Hz, where the message carries vehicle information (for example, a CAM (cooperative awareness message) or a DENM (decentralized environmental notification message)). To enable receive-end UE to verify validity of an identity of transmit-end UE, the transmit-end UE needs to add a certificate of the transmit-end UE to a message. To enable the receive-end UE to verify whether the CAM/DENM message is under a security attack (forgery or tampering), the transmit-end UE needs to sign the message by using a private key corresponding to the certificate, and add a signature value to the message. The receive-end UE first verifies validity of the certificate in the CAM/DENM message, and then verifies whether the signature value in the message is correct. For a format of a V2V (vehicle-to-vehicle) message, refer to FIG. 1. The message needs to carry a certificate (certificate) and a signature (signature).

However, it is found in practice that, in the foregoing vehicle-to-vehicle communication solution based on the DSRC technology, authentication on the UE is implemented based on the certificate. Each DSRC message carries a certificate and a signature, causing a large air-interface resource overhead. In addition, a calculation time of certificate-based signature and encryption is long. If a processing delay of a delay-sensitive vehicle-to-vehicle communication message is excessively large, relatively large impact may be caused.

SUMMARY

Embodiments of the present invention provide a communication method and a related apparatus, so that a network side performs authentication on UE during vehicle-to-vehicle communication, thereby reducing an air-interface resource overhead.

A first aspect provides a communication method, including:

receiving, by a mobility management entity MME, an attach request message sent by an evolved NodeB eNB, where the attach request message is used by user equipment UE to request to attach to a network, and the attach request message includes an identity of the UE;

sending, by the MME to a home subscriber server HSS according to the attach request message, an authentication data request message that includes the identity of the UE, so that the HSS performs authorization on the UE according to the identity of the UE;

receiving, by the MME, an authentication data response message that includes an authentication vector AV and that is sent by the HSS, where the authentication data response message is used to indicate that the authorization on the UE succeeds; and determining, by the MME according to the authentication data response message, that the UE is allowed to perform a vehicle-to-everything V2X service, and performing authentication on the UE according to the AV.

With reference to the first aspect, in a first possible implementation of the first aspect, the attach request message further includes V2X indication information, where the V2X indication information is used to indicate that the UE is of a V2X type; and the sending, by the MME to an HSS according to the attach request message, an authentication data request message that includes the identity of the UE, so that the HSS performs authorization on the UE according to the identity of the UE includes:

sending, by the MME to the HSS according to the attach request message, the authentication data request message that includes the identity of the UE and the V2X indication information, so that the HSS determines, according to the identity of the UE, whether the UE is allowed to perform the V2X service.

With reference to the first possible implementation of the first aspect, in a second possible implementation of the first aspect, the determining, by the MME according to the authentication data response message, that the UE is allowed to perform a V2X service includes:

determining, by the MME according to the authentication data response message and the V2X indication information that is included in the attach request message, that the UE is allowed to perform the V2X service.

With reference to the first aspect or the first possible implementation of the first aspect, in a third possible implementation of the first aspect, the authentication data response message further includes V2X indication information, where the V2X indication information is used to indicate that the UE is of the V2X type; and the determining, by the MME according to the authentication data response message, that the UE is allowed to perform a V2X service includes:

determining, by the MME according to the authentication data response message and the V2X indication information that is included in the authentication data response message, that the UE is allowed to perform the V2X service.

With reference to any one of the first aspect or the first to the third possible implementations of the first aspect, in a fourth possible implementation of the first aspect, after the performing, by the MME, authentication on the UE according to the AV, the method further includes:

after the authentication on the UE performed by the MME successes, sending, by the MME to the eNB, indication information indicating that the UE is allowed to perform the V2X service, so that the eNB allocates a V2X communication resource to the UE.

With reference to any one of the first aspect or the first to the third possible implementations of the first aspect, in a fifth possible implementation of the first aspect, the attach request message further includes location information of the UE, and after the performing, by the MME, authentication on the UE according to the AV, the method further includes:

sending, by the MME to a V2X server, an area key request message that includes the location information of the UE;

receiving, by the MME, an area key response message sent by the V2X server, where the area key response message includes area key information of an area corresponding to the location information of the UE and area key information of an adjacent area of the area; and sending, by the MME, an area key allocation message to the UE, where the area key allocation message includes the area key information of the area corresponding to the location information of the UE and the area key information of the adjacent area of the area, and the area key information is used by the UE in the area to perform security protection on a V2X message.

With reference to the fifth possible implementation of the first aspect, in a sixth possible implementation of the first aspect, the area key information includes a correspondence between an area key, an area key ID, and an area ID.

With reference to the fifth or the sixth possible implementation of the first aspect, in a seventh possible implementation of the first aspect, after the authentication on the UE performed by the MME successes, the method further includes:

establishing, by the MME, non-access stratum NAS security context with the UE; and the sending, by the MME, an area key allocation message to the UE includes:

sending, by the MME to the UE, an area key allocation message that is protected by using the NAS security context.

A second aspect provides another communication method, including:

receiving, by an evolved NodeB eNB, a first attach request message sent by user equipment UE;

sending, by the eNB, a second attach request message to a mobility management entity MME according to the first attach request message;

receiving, by the eNB, indication information that is sent by the MME and that indicates that the UE is allowed to perform a vehicle-to-everything V2X service; and allocating, by the eNB, a V2X communication resource to the UE according to the indication information indicating that the UE is allowed to perform the V2X service.

With reference to the second aspect, in a first possible implementation of the second aspect, before the allocating, by the eNB, a V2X communication resource to the UE according to the indication information, the method further includes:

receiving, by the eNB, a V2X resource scheduling request sent by the UE, where the V2X resource scheduling request is used to request the V2X communication resource.

With reference to the second aspect or the first possible implementation of the second aspect, in a second possible implementation of the second aspect, the allocating, by the eNB, a V2X communication resource to the UE includes:

sending, by the eNB, an area key allocation message to the UE, where the area key allocation message includes area key information of an area in which the eNB is located and area key information of an adjacent area of the area in which the eNB is located, and the area key information is used by the UE in the area to perform security protection on a V2X communication message.

With reference to the second possible implementation of the second aspect, in a third possible implementation of the second aspect, before the sending, by the eNB, an area key allocation message to the UE, the method further includes:

sending, by the eNB, an area key request message to a V2X server; and receiving, by the eNB, an area key response message sent by the V2X server, where the area key response message includes the area key information of the area in which the eNB is located and the area key information of the adjacent area of the area in which the eNB is located.

With reference to the third possible implementation of the second aspect, in a fourth possible implementation of the second aspect, the area key information includes a correspondence between an area key, an area key ID, and an area ID.

With reference to any one of the second to the fourth possible implementations of the second aspect, in a fifth possible implementation of the second aspect, the indication information indicating that the UE is allowed to perform the V2X service is included in an initial context establishment request message;

after the eNB receives the initial context establishment request message that is sent by the MME and that carries the indication information indicating that the UE is allowed to perform the V2X service, the method further includes:

establishing, by the eNB, access stratum AS security context with the UE; and the sending, by the eNB, an area key allocation message to the UE includes:

sending, by the eNB to the UE, an area key allocation message that is protected by using the AS security context.

A third aspect provides another communication method, including:

receiving, by a home subscriber server HSS, an authentication data request message that includes an identity of user equipment UE and that is sent by a mobility management entity MME;

performing, by the HSS, authorization on the UE according to the identity of the UE; and sending, by the HSS to the MME, an authentication data response message that includes an authentication vector AV, where the authentication data response message indicates that the authorization on the UE succeeds, so that the MME determines, according to the authentication data response message, that the UE is allowed to perform a vehicle-to-everything V2X service, and performs authentication on the UE according to the AV.

With reference to the third aspect, in a first possible implementation of the third aspect, the authentication data request message includes V2X indication information, where the V2X indication information is used to indicate that the UE is of a V2X type; and the performing, by the HSS, authorization on the UE according to the identity of the UE includes:

determining, by the HSS according to the identity of the UE, whether the UE is allowed to perform the V2X service.

With reference to the third aspect, in a second possible implementation of the third aspect, the authentication data request message does not include V2X indication information, and the authentication data response message further includes the V2X indication information, where the V2X indication information is used to indicate that the UE is of a V2X type.

A fourth aspect provides another communication method, including:

generating, by a vehicle-to-everything V2X server, an area key of an area in which a first communications device is located; and sending, by the V2X server, the area key to the first communications device.

With reference to the fourth aspect, in a first possible implementation of the fourth aspect, the sending, by the V2X server, the area key to the first communications device includes:

sending, by the V2X server to an evolved NodeB eNB, area key information of an area in which the eNB is located and area key information of an adjacent area of the area in which the eNB is located.

With reference to the fourth aspect, in a second possible implementation of the fourth aspect, the sending, by the V2X server, a related area key to a corresponding device includes:

receiving, by the V2X server, an area key request message sent by the eNB; and sending, by the V2X server, an area key response message to the eNB, where the area key response message includes area key information of an area in which the eNB is located and area key information of an adjacent area of the area in which the eNB is located.

With reference to the fourth aspect, in a third possible implementation of the fourth aspect, the sending, by the V2X server, the area key to the first communications device includes:

receiving, by the V2X server, an area key request message sent by a mobility management entity MME, where the area key request message includes location information of user equipment UE; and sending, by the V2X server, an area key response message to the MME, where the area key response message includes area key information of an area corresponding to the location information of the UE and area key information of an adjacent area of the area.

With reference to the fourth aspect, in a fourth possible implementation of the fourth aspect, the sending, by the V2X server, the area key to the first communications device includes:

establishing, by the V2X server to user equipment UE, a security connection of a generic bootstrapping architecture GBA or GBA push security mechanism;

receiving, by the V2X server, an area key request message sent by the UE, where the area key request message includes location information of the UE; and sending, by the V2X server, an area key response message to the UE, where the area key response message includes area key information of an area corresponding to the location information of the UE and area key information of an adjacent area of the area.

A fifth aspect provides another communication method, including:

sending, by user equipment UE, an attach request message to an evolved NodeB eNB; and receiving, by the UE, a vehicle-to-everything V2X communication resource allocated by the eNB, where the V2X communication resource is allocated to the UE when the eNB receives indication information indicating that the UE is allowed to perform a V2X service; or receiving, by the UE, an area key allocation message sent by a mobility management entity MME, where the area key allocation message is sent to the UE after the MME determines that the UE is allowed to perform the V2X service and the authentication on the UE successes, and the area key allocation message includes area key information of an area corresponding to location information of the UE and area key information of an adjacent area of the area.

With reference to the fifth aspect, in a first possible implementation of the fifth aspect, the receiving, by the UE, a V2X communication resource allocated by the evolved NodeB eNB includes:

receiving, by the UE, an area key allocation message sent by the eNB, where the area key allocation message includes area key information of an area in which the eNB is located and area key information of an adjacent area of the area in which the eNB is located.

With reference to the fifth aspect, in a second possible implementation of the fifth aspect, after the sending, by UE, an attach request message to an eNB, the method further includes:

sending, by the UE, an area key request message to the eNB; and receiving, by the UE, an area key response message sent by the eNB, where the area key response message includes area key information of an area in which the eNB is located and area key information of an adjacent area of the area in which the eNB is located.

With reference to the fifth aspect or the first to the second possible implementations of the fifth aspect, in a third possible implementation of the fifth aspect, the area key information includes a correspondence between an area key, an area key ID, and an area ID.

With reference to the third possible implementation of the fifth aspect, in a fourth possible implementation of the fifth aspect, the method further includes:

sending, by the UE, a V2X message to a receive end, where the V2X message includes message content, the area key ID, the area ID, and a message verification value, where the message verification value is obtained by performing, by using the area key corresponding to the area key ID and the area ID, integrity protection on the message content, the area key ID, and the area ID.

With reference to any one of the fifth aspect or the first to the fourth possible implementations of the fifth aspect, in a fifth possible implementation of the fifth aspect, the attach request message includes V2X indication information, where the V2X indication information is used to indicate that the UE is of a V2X type.

A sixth aspect provides a communications apparatus, including:

a receiving module, configured to receive an attach request message sent by an evolved NodeB eNB, where the attach request message is used by user equipment UE to request to attach to a network, and the attach request message includes an identity of the UE;

a sending module, configured to send, to a home subscriber server HSS according to the attach request message, an authentication data request message that includes the identity of the UE, so that the HSS performs authorization on the UE according to the identity of the UE, where the receiving module is further configured to receive an authentication data response message that includes an authentication vector AV and that is sent by the HSS, where the authentication data response message is used to indicate that the authorization on the UE succeeds;

a determining module, configured to determine, according to the authentication data response message, that the UE is allowed to perform a vehicle-to-everything V2X service; and an authentication module, configured to perform authentication on the UE according to the AV.

With reference to the sixth aspect, in a first possible implementation of the sixth aspect, the attach request message further includes V2X indication information, where the V2X indication information is used to indicate that the UE is of a V2X type; and the sending module is specifically configured to send, to the HSS according to the attach request message, the authentication data request message that includes the identity of the UE and the V2X indication information, so that the HSS determines, according to the identity of the UE, whether the UE is allowed to perform the V2X service.

With reference to the first possible implementation of the sixth aspect, in a second possible implementation of the sixth aspect, the determining module is specifically configured to determine, according to the authentication data response message and the V2X indication information that is included in the attach request message, that the UE is allowed to perform the V2X service.

With reference to the sixth aspect or the first possible implementation of the sixth aspect, in a third possible implementation of the sixth aspect, the authentication data response message further includes V2X indication information, where the V2X indication information is used to indicate that the UE is of the V2X type; and the determining module is specifically configured to determine, according to the authentication data response message and the V2X indication information that is included in the authentication data response message, that the UE is allowed to perform the V2X service.

With reference to any one of the sixth aspect or the first to the third possible implementations of the sixth aspect, in a fourth possible implementation of the sixth aspect, the sending module is further configured to: after the authentication on the UE performed by the authentication module successes, send, to the eNB, indication information indicating that the UE is allowed to perform the V2X service, so that the eNB allocates a V2X communication resource to the UE.

With reference to any one of the sixth aspect or the first to the third possible implementations of the sixth aspect, in a fifth possible implementation of the sixth aspect, the attach request message further includes location information of the UE;

the sending module is further configured to send, to a V2X server, an area key request message that includes the location information of the UE;

the receiving module is further configured to receive an area key response message sent by the V2X server, where the area key response message includes area key information of an area corresponding to the location information of the UE and area key information of an adjacent area of the area; and the sending module is further configured to send an area key allocation message to the UE, where the area key allocation message includes the area key information of the area corresponding to the location information of the UE and the area key information of the adjacent area of the area, and the area key information is used by the UE in the area to perform security protection on a V2X message.

With reference to the fifth possible implementation of the sixth aspect, in a sixth possible implementation of the sixth aspect, the area key information includes a correspondence between an area key, an area key ID, and an area ID.

With reference to the fifth or the sixth possible implementation of the sixth aspect, in a seventh possible implementation of the sixth aspect, the apparatus further includes:

an establishment module, configured to establish non-access stratum NAS security context with the UE after the authentication on the UE performed by the authentication module successes, where the sending module is specifically configured to send, to the UE, an area key allocation message that is protected by using the NAS security context.

A seventh aspect provides another communications apparatus, including:

a receiving module, configured to receive a first attach request message sent by user equipment UE;

a sending module, configured to send a second attach request message to a mobility management entity MME according to the first attach request message, where the receiving module is further configured to receive indication information that is sent by the MME and that indicates that the UE is allowed to perform a vehicle-to-everything V2X service; and an allocation module, further configured to allocate a V2X communication resource to the UE according to the indication information indicating that the UE is allowed to perform the V2X service.

With reference to the seventh aspect, in a first possible implementation of the seventh aspect, the receiving module is further configured to receive a V2X resource scheduling request sent by the UE, where the V2X resource scheduling request is used to request the V2X communication resource.

With reference to the seventh aspect or the first possible implementation of the seventh aspect, in a second possible implementation of the seventh aspect, the allocation module is specifically configured to send an area key allocation message to the UE, where the area key allocation message includes area key information of an area in which the eNB is located and area key information of an adjacent area of the area in which the eNB is located, and the area key information is used by the UE in the area to perform security protection on a V2X communication message.

With reference to the second possible implementation of the seventh aspect, in a third possible implementation of the seventh aspect, the sending module is further configured to send an area key request message to a V2X server; and the receiving module is further configured to receive an area key response message sent by the V2X server, where the area key response message includes the area key information of the area in which the eNB is located and the area key information of the adjacent area of the area in which the eNB is located.

With reference to the third possible implementation of the seventh aspect, in a fourth possible implementation of the seventh aspect, the area key information includes a correspondence between an area key, an area key ID, and an area ID.

With reference to any one of the second to the fourth possible implementations of the seventh aspect, in a fifth possible implementation of the seventh aspect, the indication information indicating that the UE is allowed to perform the V2X service is included in an initial context establishment request message; and the apparatus further includes:

an establishment module, configured to establish access stratum AS security context with the UE, where the sending module is specifically configured to send, to the UE, an area key allocation message that is protected by using the AS security context.

An eighth aspect provides another communication apparatus, including:

a receiving module, configured to receive an authentication data request message that includes an identity of user equipment UE and that is sent by a mobility management entity MME;

an authorization module, configured to perform authorization on the UE according to the identity of the UE; and a sending module, configured to send, to the MME, an authentication data response message that includes an authentication vector AV, where the authentication data response message indicates that the authorization on the UE succeeds, so that the MME determines, according to the authentication data response message, that the UE is allowed to perform a vehicle-to-everything V2X service, and performs authentication on the UE according to the AV.

With reference to the eighth aspect, in a first possible implementation of the eighth aspect, the authentication data request message includes V2X indication information, where the V2X indication information is used to indicate that the UE is of a V2X type; and the authorization module is specifically configured to determine, according to the identity of the UE, whether the UE is allowed to perform the V2X service.

With reference to the eighth aspect, in a second possible implementation of the eighth aspect, the authentication data request message does not include V2X indication information, and the authentication data response message further includes the V2X indication information, where the V2X indication information is used to indicate that the UE is of a V2X type.

A ninth aspect provides another communications apparatus, including:

a generation module, configured to generate an area key of an area in which a first communications device is located; and a sending module, configured to send the area key to the first communications device.

With reference to the ninth aspect, in a first possible implementation of the ninth aspect, the sending module is specifically configured to send, to an evolved NodeB eNB, area key information of an area in which the eNB is located and area key information of an adjacent area of the area in which the eNB is located.

With reference to the ninth aspect, in a second possible implementation of the ninth aspect, the sending module is specifically configured to send an area key response message to the eNB when the apparatus receives an area key request message sent by the eNB, where the area key response message includes area key information of an area in which the eNB is located and area key information of an adjacent area of the area in which the eNB is located.

With reference to the ninth aspect, in a fourth possible implementation of the ninth aspect, the apparatus further includes:

an establishment module, configured to establish, to user equipment UE, a security connection of a generic bootstrapping architecture GBA or GBA push security mechanism, where the sending module is specifically configured to send an area key response message to the UE when the apparatus receives an area key request message sent by the UE and the area key request message includes location information of the UE, where the area key response message includes area key information of an area corresponding to the location information of the UE and area key information of an adjacent area of the area.

A tenth aspect provides another communications apparatus, including:

a sending module, configured to send an attach request message to an evolved NodeB eNB; and a receiving module, configured to: receive a vehicle-to-everything V2X communication resource allocated by the eNB, where the V2X communication resource is allocated to the UE when the eNB receives indication information indicating that the UE is allowed to perform a V2X service; or receive an area key allocation message sent by a mobility management entity MME, where the area key allocation message is sent to the UE after the MME determines that the UE is allowed to perform the V2X service and the authentication on the UE successes, and the area key allocation message includes area key information of an area corresponding to location information of the UE and area key information of an adjacent area of the area.

With reference to the tenth aspect, in a first possible implementation of the tenth aspect, the receiving module is specifically configured to receive an area key allocation message sent by the eNB, where the area key allocation message includes area key information of an area in which the eNB is located and area key information of an adjacent area of the area in which the eNB is located.

With reference to the tenth aspect, in a second possible implementation of the tenth aspect, the sending module is further configured to send an area key request message to the eNB; and the receiving module is further configured to receive an area key response message sent by the eNB, where the area key response message includes area key information of an area in which the eNB is located and area key information of an adjacent area of the area in which the eNB is located.

With reference to the tenth aspect or the first to the second possible implementations of the tenth aspect, in a third possible implementation of the tenth aspect, the area key information includes a correspondence between an area key, an area key ID, and an area ID.

With reference to the third possible implementation of the tenth aspect, in a fourth possible implementation of the tenth aspect, the sending module is specifically configured to send a V2X message to a receive end, where the V2X message includes message content that is encrypted by using the area key, and the area key ID and the area ID that are corresponding to the area key.

With reference to any one of the tenth aspect or the first to the fourth possible implementations of the tenth aspect, in a fifth possible implementation of the tenth aspect, the attach request message includes V2X indication information, where the V2X indication information is used to indicate that the UE is of a V2X type.

Compared with the prior art, the embodiments of the present invention have the following beneficial effect:

In the embodiments of the present invention, after receiving the attach request message sent by the eNB, the MME may send, to the HSS according to the attach request message, the authentication data request message that includes the identity of the UE, so that the HSS performs authorization on the UE according to the identity of the UE; further receive the authentication data response message that includes the AV and that is sent by the HSS; determine, according to the authentication data response message, that the UE is allowed to perform the V2X service; and perform authentication on the UE according to the AV. This enables the network side to perform authentication on the UE during the vehicle-to-vehicle communication, thereby reducing the air-interface resource overhead.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without undue experiment shall fall within the protection scope of the present invention.

The embodiments of the present invention provide a communication method, so that a network side performs authentication on UE during vehicle-to-vehicle communication, thereby reducing an air-interface resource overhead. The following separately provides descriptions.

Figures 1, 2:
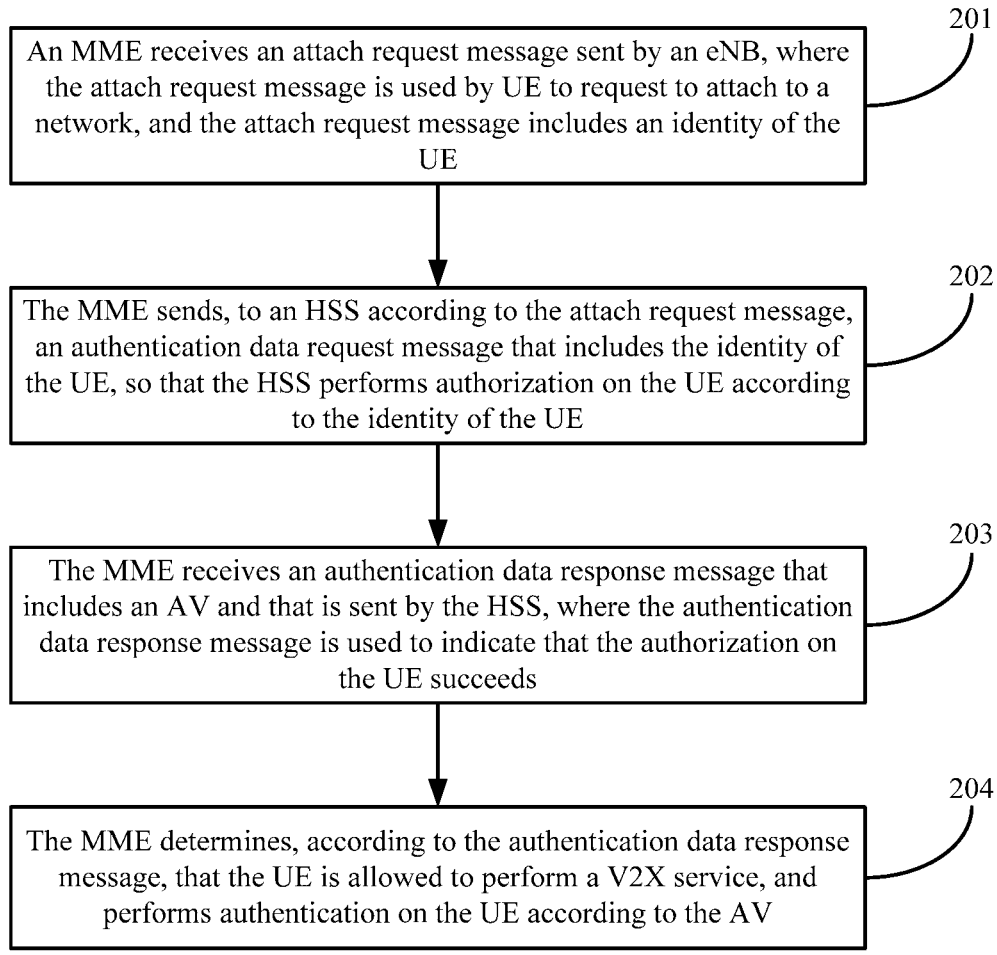
FIG. 1 is a schematic diagram of an existing V2V message format.
FIG. 2 is a schematic flowchart of a communication method according to an embodiment of the present invention.

Referring to FIG. 2, FIG. 2 is a schematic flowchart of a communication method according to an embodiment of the present invention. The communication method described in FIG. 2 is mainly described from an MME side. As shown in FIG. 2, the method may include the following steps.

Step 201: An MME receives an attach request message sent by an eNB, where the attach request message is used by UE to request to attach to a network, and the attach request message includes an identity of the UE.

In this embodiment of the present invention, when the UE needs to be attached to the network, the UE may send the attach request message to the eNB (evolved NodeB). After receiving the attach request message (a first attach request message), the eNB may send a second attach request message to the MME (mobility management entity) according to the first attach request message.

In some embodiments, after receiving the first attach request message sent by the UE, the eNB may not process the first attach request message, but directly forward the first attach request message to the MME. In this case, the first attach request message is the same as the second attach request message. Alternatively, after receiving the first attach request message sent by the UE, the eNB may perform corresponding processing on the first attach request message, re-encapsulate a processed message into the second attach request message, and forward the second attach request message to the MME. In this case, the first attach request message may be different from the second attach request message.

In some embodiments, the attach request message may further include V2X (vehicle-to-everything) indication information, where the V2X indication information is used to indicate that the UE is of a V2X type, that is, the UE is capable of performing V2X communication. After receiving the attach request message, the MME may learn, according to the V2X indication information included in the attach request message, that the UE is of the V2X type.

In this embodiment of the present invention, V2X may also be referred to as LTE-V2X, that is, LTE (long term evolution)-based vehicle-to-everything. The V2X communication may include but is not limited to V2V communication, V2I (vehicle-to-infrastructure) communication, and V2P (vehicle-to-pedestrian) communication. The V2I communication may include but is not limited to communication between a vehicle and a base station, communication between a vehicle and a roadside unit, communication between a vehicle and a communication module on a traffic light, and the like.

Step 202: The MME sends, to an HSS according to the attach request message, an authentication data request message that includes the identity of the UE, so that the HSS performs authorization on the UE according to the identity of the UE.

In this embodiment of the present invention, after receiving the attach request message sent by the eNB, the MME needs to determine whether the UE is allowed to perform a V2X service.

In this embodiment of the present invention, after receiving the attach request message that includes the identity of the UE and that is sent by the eNB, the MME may send, to the HSS (home subscriber server), the authentication data request message that includes the identity of the UE. After receiving the authentication data request message sent by the MME, the HSS may query for corresponding subscription information according to the identity of the UE, and determine, according to the subscription information, whether the UE is allowed to perform the V2X service. When the HSS determines that the UE is allowed to perform the V2X service, the HSS may send, to the MME, an authentication data response message that includes an AV (authentication vector). The identity of the UE may include but is not limited to an IMSI (international mobile subscriber identity) or a TMSI (temporary mobile subscriber identity) of the UE, or the like.

After receiving the authentication data response message sent by the HSS, the MME may perform authentication on the UE according to the AV included in the authentication data response message. For a specific implementation of performing authentication on the UE by the MME, refer to a related implementation of performing authentication on UE by an MME in the prior art. Details are not described in this embodiment of the present invention.

In some embodiments, when the attach request message of the UE further includes V2X indication information, the sending, by the MME to an HSS according to the attach request message, an authentication data request message that includes the identity of the UE, so that the HSS performs authorization on the UE according to the identity of the UE in the foregoing step 202 may include:

sending, by the MME to the HSS according to the attach request message, the authentication data request message that includes the identity of the UE and the V2X indication information, so that the HSS determines, according to the identity of the UE, whether the UE is allowed to perform the V2X service.

In this implementation, the MME adds the V2X indication information to the authentication data request message that is sent to the HSS, so that when learning that the UE is of the V2X type, the HSS queries for the subscription information of the UE according to the identity of the UE, and determines, according to the subscription information, whether the UE is allowed to perform the V2X service.

When the authentication data request message received by the HSS includes the V2X indication information, the authentication data response message sent by the HSS to the MME may include the V2X indication information, or may not include the V2X indication information. This embodiment of the present invention sets no limitation thereon.

In some embodiments, the authentication data response message sent by the HSS to the MME may further include the V2X indication information, where the V2X indication information is used to indicate that the UE is of the V2X type, so that the MME learns that the UE is of the V2X type.

Step 203: The MME receives an authentication data response message that includes an AV and that is sent by the HSS, where the authentication data response message is used to indicate that the authorization on the UE succeeds.

In this embodiment of the present invention, after the authorization on the UE by the HSS succeeds, the HSS may send, to the MME, the authentication data response message that includes the AV. After receiving the authentication data response message, the MME may determine that the authorization on the UE succeeds. Further, the MME may perform authentication on the UE according to the AV included in the authentication data response message.

Step 204: The MME determines, according to the authentication data response message, that the UE is allowed to perform a V2X service, and performs authentication on the UE according to the AV.

In some embodiments, when the attach request message includes the V2X indication information, the determining, by the MME according to the authentication data response message, that the UE is allowed to perform a V2X service may include:

determining, by the MME according to the authentication data response message and the V2X indication information that is included in the attach request message, that the UE is allowed to perform the V2X service.

In this implementation, when the attach request message includes a V2X indication information, the MME may determine that the UE is of the V2X type. Further, when the MME receives the authentication data response message used to indicate that the authorization on the UE succeeds, the MME may determine that the UE is allowed to perform the V2X service.

In some embodiments, the authentication data response message further includes V2X indication information, where the V2X indication information is used to indicate that the UE is of the V2X type.

Correspondingly, the determining, by the MME according to the authentication data response message, that the UE is allowed to perform a V2X service may include:

determining, by the MME according to the authentication data response message and the V2X indication information that is included in the authentication data response message, that the UE is allowed to perform the V2X service.

In this implementation, when receiving the authentication data response message sent by the HSS, the MME may determine that the authorization on the UE succeeds. Further, the MME may determine, according to the V2X indication information included in the authentication data response message, that the UE is of the V2X type. Therefore, the MME may determine that the UE is allowed to perform the V2X service.

In this embodiment of the present invention, after determining that the UE is allowed to perform the V2X service, the MME may perform authentication on the UE according to the AV included in the authentication data response message.

Specifically, the MME may send an authentication request message (UE Authentication Request) to the UE, and receive an authentication response message (UE Authentication Response) returned by the UE, where the authentication response message includes a RES (response) value. The MME may compare the RES value with an XRES (expected response) value included in the AV. If the RES value and the XRES value are the same, it is determined that the authentication on the UE successes; otherwise, it is determined that the UE fails the authentication.

Further, in some embodiments, after the performing, by the MME, authentication on the UE according to the AV, the method may further include:

after the authentication on the UE performed by the MME successes, sending, by the MME to the eNB, indication information indicating that the UE is allowed to perform the V2X service, so that the eNB allocates a V2X communication resource to the UE.

In this implementation, the MME determines that the UE is allowed to perform the V2X service, and after the authentication on the UE performed by the MME successes, the MME may send, to the eNB, the indication information indicating that the UE is allowed to perform the V2X service.

In this implementation, after receiving the indication information, the eNB may determine that the UE is authorized UE of the V2X type. Therefore, the eNB may allocate, to the UE, information required when the UE performs V2X communication.

In this implementation, after receiving the indication information, the eNB may actively allocate, to the UE, the information required when the UE performs V2X communication. Alternatively, after receiving the indication information, the eNB may wait until a V2X communication information obtaining request sent by the UE is received and then send, to the UE, the information required when the UE performs V2X communication.

In this embodiment of the present invention, the information required when the UE performs V2X communication may include but is not limited to a time-frequency resource, area key information of an area in which the eNB currently serving the UE is located, and area key information of an adjacent area.

In this embodiment of the present invention, an area key is generated and managed, and one area is corresponding to a same area key. Therefore, a certificate does not need to be configured and managed for each UE, thereby reducing security management workload of a CA. In addition, when using the area key to perform security protection on a V2X message, the UE only needs to add an area key ID and an area ID to the message. A size of the area key ID and the area ID is far less than a size of a certificate and a signature. Therefore, compared with that in a vehicle-to-vehicle communication solution implemented based on a DSRC technology, the vehicle-to-vehicle communication message in the technical solution provided in this embodiment of the present invention is smaller, thereby reducing a security overhead. In addition, compared with a calculation time of certificate-based signature and encryption in the vehicle-to-vehicle communication solution implemented based on the DSRC technology, a time spent in performing, by using the area key, security protection on the V2X message in the technical solution provided in this embodiment of the present invention is less, thereby reducing a message processing delay.

In some embodiments, the attach request message may further include location information of the UE. Correspondingly, after the performing, by the MME, authentication on the UE according to the AV, the method may further include the following steps:

(11). The MME sends, to a V2X server, an area key request message that includes the location information of the UE.

(12). The MME receives an area key response message sent by the V2X server, where the area key response message includes area key information of an area corresponding to the location information of the UE and area key information of an adjacent area of the area.

(13). The MME sends an area key allocation message to the UE, where the area key allocation message includes the area key information of the area corresponding to the location information of the UE and the area key information of the adjacent area of the area, and the area key information is used by the UE in the area to perform security protection on a V2X message.

In this implementation, the area key is generated and stored by the V2X server. After the MME determines that the UE is allowed to perform the V2X service and the authentication on UE performed by the MME successes, the MME may send, to the V2X server, the area key request message that includes the location information of the UE, so as to obtain the area key information corresponding to the location information of the UE and the area key information of the adjacent area of the area. After obtaining the area key information corresponding to the location information of the UE and the area key information of the adjacent area of the area, the MME may allocate the area key information to the UE, so that the UE performs security protection on the V2X message according to the area key information.

In some embodiments, the area key information may include a correspondence between an area key, an area key ID, and an area ID. The area key ID is used to uniquely identify an area key. The area ID is used to uniquely identify an area.

After receiving the area key allocation message sent by the MME, the UE may store a correspondence between an area key, an area key ID, and an area ID that are of the area corresponding to the location information of the UE, and a correspondence between an area key, an area key ID, and an area ID that are of the adjacent area of the area, where the correspondences are included in the area key allocation message. When the UE needs to perform V2X communication, transmit-end UE may perform integrity protection on a V2X message by using an area key of an area in which the transmit-end UE is currently located, and add, to the V2X message, an area key ID and an area ID of the area in which the transmit-end UE is currently located. For example, the transmit-end UE may further encrypt message content of the V2X message by using the area key of the area in which the transmit-end UE is currently located (that is, the V2X message may include encrypted message content, the area key ID, and the area ID).

After receiving the V2X message sent by the transmit-end UE, receive-end UE may query, according to the area key ID and the area ID that are included in the V2X message, for a correspondence that is between an area key, an area key ID, and an area ID and that is stored by the receive-end UE, so as to determine an area key corresponding to both the area key ID and the area ID that are included in the V2X message, and perform integrity verification on the V2X message according to the area key. In some embodiments, when the message content included in the V2X message is the encrypted message content, the receive-end UE may decrypt the encrypted message content according to the area key.

In some embodiments, after the authentication on the UE performed by the MME successes, the method may further include:

establishing, by the MME, NAS (non-access stratum) security context with the UE.

Specifically, after the authentication on the UE performed by the MME successes, the MME may establish the NAS security context with the UE. For a specific implementation thereof, refer to a related process of establishing NAS security context in the prior art. Details are not described in this embodiment of the present invention.

Correspondingly, the sending, by the MME, an area key allocation message to the UE may include:

sending, by the MME to the UE, an area key allocation message that is protected by using the NAS security context.

In this embodiment of the present invention, areas may be obtained by division according to geographical locations. For example, an area covered by one eNB or multiple eNBs forms an area. Alternatively, one or more TAs (tracking area identity) serve as an area. Each area is corresponding to an area key. UE of a V2X type in the area performs security protection on a V2X message by using the area key.

Based on the foregoing area division policy, in this embodiment of the present invention, one eNB may cover multiple areas. Alternatively, one area may include multiple eNBs (that is, coverage areas of multiple eNBs form one area).

Correspondingly, in an implementation of allocating an area key to UE by an eNB, if one eNB covers multiple areas, location information of the UE needs to be included when the UE requests the area key from the eNB. After receiving an area key obtaining request sent by the UE, the eNB needs to obtain, according to the location information of the UE, area key information of an area corresponding to the location information and area key information of an adjacent area of the area, and allocate the area key information to the UE.

If one area may include multiple eNBs, when the UE requests the area key from an eNB, location information of the UE may not be included. After receiving an area key obtaining request sent by the UE, the eNB may directly obtain area key information of the area in which the eNB is located and area key information of an adjacent area of the area in which the eNB is located, and allocate the area key information to the UE.

In some embodiments, the area key may be generated and managed by an eNB.

In this implementation, when the area key is generated and managed by the eNB, after generating the area key, the eNB needs to notify an eNB in an adjacent area of area key information of the area key generated by the eNB. Notification of the area key information between the eNBs may be implemented by modifying an existing X2 interface instruction, or may be implemented by using a new X2 interface instruction.

In some embodiments, the area key may be generated and managed by a V2X server, and configured onto a corresponding eNB.

In this implementation, a V2X server may be deployed in a system. The V2X server is configured to generate and manage an area key, and configure the area key onto a corresponding eNB. Because all area keys are generated and managed by the V2X server, reuse of an area key can be avoided.

In some embodiments, a V2X server may be deployed in a system. The V2X server is configured to generate and manage an area key. The V2X server does not send the area key to an eNB, that is, the eNB is not aware of the area key. The V2X server may directly allocate the area key to UE, or allocate the area key to UE by using an MME.

Figure 3:
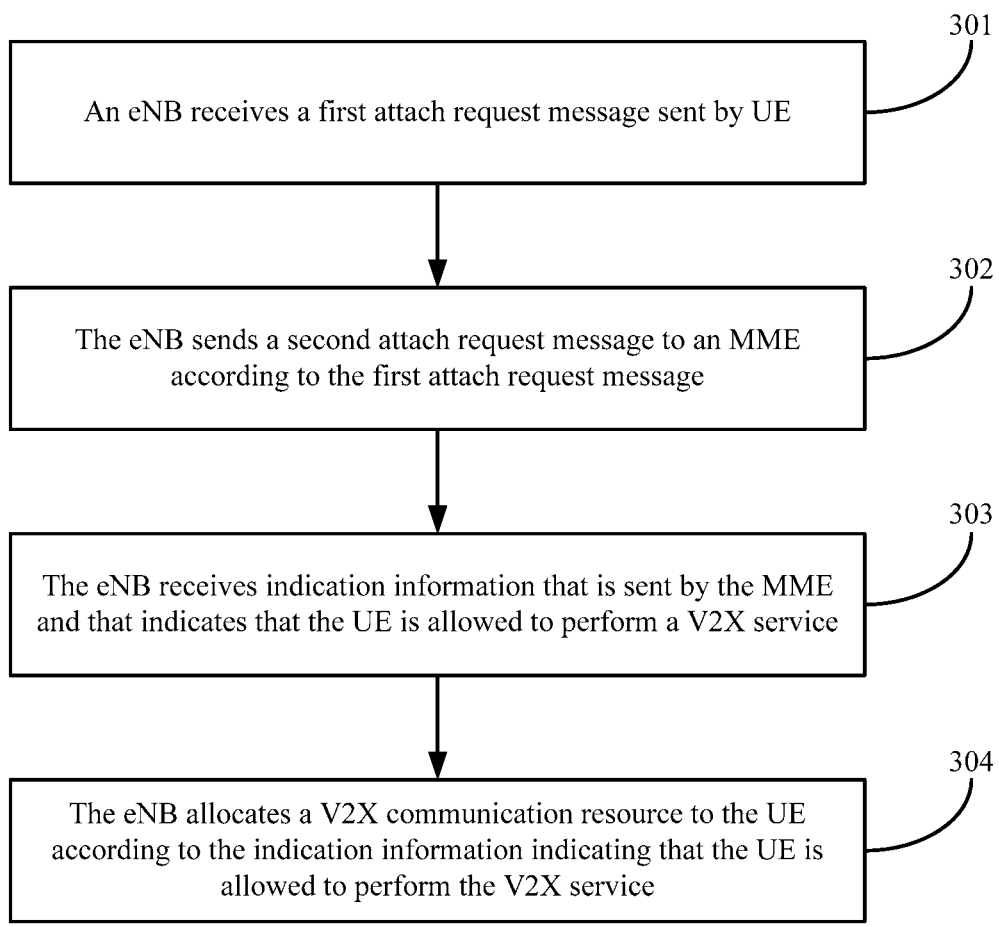
FIG. 3 is a schematic flowchart of another communication method according to an embodiment of the present invention.

Referring to FIG. 3, FIG. 3 is a schematic flowchart of another communication method according to an embodiment of the present invention. The communication method described in FIG. 3 is mainly described from an eNB side. As shown in FIG. 3, the method may include the following steps.

Step 301: An eNB receives a first attach request message sent by UE.

Step 302: The eNB sends a second attach request message to an MME according to the first attach request message.

In this embodiment of the present invention, when the UE needs to be attached to a network, the UE may send the attach request message to the eNB. After receiving the attach request message, the NB may send the second attach request message to the MME according to the first attach request message.

In some embodiments, after receiving the first attach request message sent by the UE, the eNB may not process the first attach request message, but directly forward the first attach request message to the MME. In this case, the first attach request message is the same as the second attach request message. Alternatively, after receiving the first attach request message sent by the UE, the eNB may perform corresponding processing on the first attach request message, re-encapsulate a processed message into the second attach request message, and forward the second attach request message to the MME. In this case, the first attach request message may be different from the second attach request message.

Step 303: The eNB receives indication information that is sent by the MME and that indicates that the UE is allowed to perform a V2X service.

In this embodiment of the present invention, after receiving the second attach request message sent by the eNB, the MME may send an authentication data request message to an HSS, and perform authentication on the UE after determining that the UE is allowed to perform the V2X service. For a specific implementation thereof, refer to related descriptions in the process shown in FIG. 2. Details are not described herein.

In this embodiment of the present invention, the MME determines that the UE is allowed to perform the V2X service, and after the authentication on the UE performed by the MME successes, the MME may send, to the eNB, the indication information indicating that the UE is allowed to perform the V2X service.

Step 304: The eNB allocates a V2X communication resource to the UE according to the indication information indicating that the UE is allowed to perform the V2X service.

In some embodiments, after receiving the indication information indicating that the UE is allowed to perform the V2X service, the eNB may actively allocate the V2X communication resource to the UE.

In some embodiments, after receiving the indication information indicating that the UE is allowed to perform the V2X service, the eNB may wait until a V2X resource scheduling request sent by the UE is received, and then allocate the V2X communication resource to the UE.

Correspondingly, in this implementation, before the allocating, by the eNB, a V2X communication resource to the UE according to the indication information indicating that the UE is allowed to perform the V2X service, the method may further include:

receiving, by the eNB, the V2X resource scheduling request sent by the UE, where the V2X resource scheduling request is used to request the V2X communication resource.

In this embodiment of the present invention, the V2X communication resource may include but is not limited to a time-frequency resource, area key information of an area in which the eNB currently serving the UE is located, and area key information of an adjacent area.

Correspondingly, in some embodiments, the allocating, by the eNB, a V2X communication resource to the UE may include:

sending, by the eNB, an area key allocation message to the UE, where the area key allocation message includes area key information of an area in which the eNB is located and area key information of an adjacent area of the area in which the eNB is located, and the area key information is used by the UE in the area to perform security protection on a V2X communication message.

In this embodiment of the present invention, the area key information may be generated and managed by the eNB. Alternatively, the area key information may be generated and managed by a V2X server, and configured onto a corresponding eNB.

Correspondingly, in some embodiments, before the sending, by the eNB, an area key allocation message to the UE, the method may further include the following steps:

(21). The eNB sends an area key request message to the V2X server.

(22). The eNB receives an area key response message sent by the V2X server, where the area key response message includes the area key information of the area in which the eNB is located and the area key information of the adjacent area of the area in which the eNB is located.

In some embodiments, the area key information may include a correspondence between an area key, an area key ID, and an area ID.

Correspondingly, after receiving the area key allocation message sent by the eNB, the UE may store the correspondence between the area key, the area key ID, and the area ID that are of the area in which the eNB is located, and a correspondence between an area key, an area key ID, and an area ID that are of the adjacent area, where the correspondences are included in the area key allocation message. When the UE needs to perform V2X communication, transmit-end UE may perform integrity protection on a V2X message by using an area key of an area in which the transmit-end UE is currently located, and add, to the V2X message, an area key ID and an area ID of the area in which the transmit-end UE is currently located. For example, the transmit-end UE may further encrypt message content of the V2X message by using the area key of the area in which the transmit-end UE is currently located (that is, the V2X message may include encrypted message content, the area key ID, and the area ID).

After receiving the V2X message sent by the transmit end, receive-end UE may query, according to the area key ID and the area ID that are included in the V2X message, for a correspondence that is between an area key, an area key ID, and an area ID and that is stored by the receive-end UE, so as to determine an area key corresponding to both the area key ID and the area ID that are included in the V2X message, and perform integrity verification on the V2X message according to the area key. In some embodiments, when the message content included in the V2X message is the encrypted message content, the receive-end UE may decrypt the encrypted message content according to the area key.

In some embodiments, the indication information indicating that the UE is allowed to perform the V2X service may be included in an initial context establishment request message.

Correspondingly, after receiving the initial context establishment request message that is sent by the MME and that carries the indication information indicating that the UE is allowed to perform the V2X service, the eNB may establish AS (Access Stratum, access stratum) security context with the UE. For a specific implementation of establishing, by the eNB, the AS security context with the UE, refer to a related process in the prior art. Details are not described in this embodiment of the present invention.

Correspondingly, in this implementation, the sending, by the eNB, an area key allocation message to the UE may include:

sending, by the eNB to the UE, an area key allocation message that is protected by using the AS security context.

Figure 4:
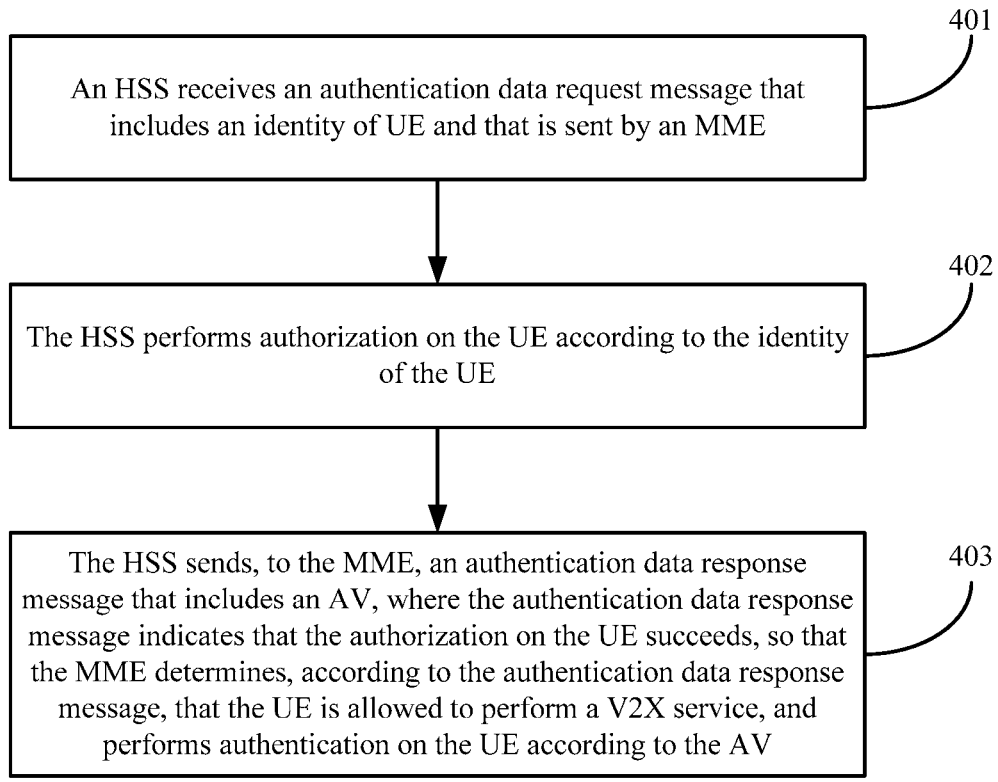
FIG. 4 is a schematic flowchart of another communication method according to an embodiment of the present invention.

Referring to FIG. 4, FIG. 4 is a schematic flowchart of a communication method according to an embodiment of the present invention. The communication method described in FIG. 4 is mainly described from an HSS side. As shown in FIG. 4, the method may include the following steps.

Step 401: An HSS receives an authentication data request message that includes an identity of UE and that is sent by an MME.

In this embodiment of the present invention, after receiving an attach request message that includes the identity of the UE and that is sent by an eNB, the MME may send, to the HSS, the authentication data request message that includes the identity of the UE.

In this embodiment of the present invention, the identity of the UE may include but is not limited to an IMSI or a TMSI of the UE, or the like.

Step 402: The HSS performs authorization on the UE according to the identity of the UE.

In this embodiment of the present invention, after receiving the authentication data request message sent by the MME, the HSS may query for subscription information of the UE according to the identity of the UE that is included in the authentication data request message, and perform authorization on the UE according to the subscription information.

In some embodiments, the authentication data response message may include V2X indication information, where the V2X indication information is used to indicate that the UE is of a V2X type.

Correspondingly, the performing, by the HSS, authorization on the UE according to the identity of the UE may include:

determining, by the HSS according to the identity of the UE, whether the UE is allowed to perform a V2X service.

In this implementation, when the authentication data response message includes the V2X indication information, after receiving the authentication data response message, the HSS may first query for the corresponding subscription information according to the identity of the UE that is included in the authentication data request message, and determine, according to the subscription information, whether the UE is allowed to perform the V2X service.

Step 403: The HSS sends, to the MME, an authentication data response message that includes an AV, where the authentication data response message indicates that the authorization on the UE succeeds, so that the MME determines, according to the authentication data response message, that the UE is allowed to perform a V2X service, and performs authentication on the UE according to the AV.

In this embodiment of the present invention, when the HSS determines that the UE is allowed to perform the V2X service and the authorization on the UE by the HSS succeeds, the HSS may send, to the MME, the authentication data response message that includes the AV, so that the MME learns that the authorization on the UE succeeds.

In this embodiment of the present invention, for a specific implementation of determining, by the MME according to the authentication data response message, that the UE is allowed to perform the V2X service, and performing authentication on the UE according to the AV, refer to related descriptions in the process shown in FIG. 2. Details are not described herein.

In some embodiments, when the authentication data request message does not include the V2X indication information, to make the MME learn that the UE is of the V2X type, the authentication data response message may further include the V2X indication information, where the V2X indication information is used to indicate that the UE is of the V2X type.

In this implementation, when the authentication data request message does not include the V2X indication information, after the HSS obtains, by means of querying, the corresponding subscription information according to the identity of the UE, if it is determined, according to the subscription information, that the UE is allowed to perform the V2X service, the HSS may determine that the UE is of the V2X type. Further, the HSS may add the V2X indication information to the authentication data response message, so that the MME learns that the UE is of the V2X type.

In this embodiment of the present invention, for related processing after the authentication on the UE performed by the MME successes, refer to related descriptions in the process shown in FIG. 2 or FIG. 3. Details are not described herein.

Figure 5:
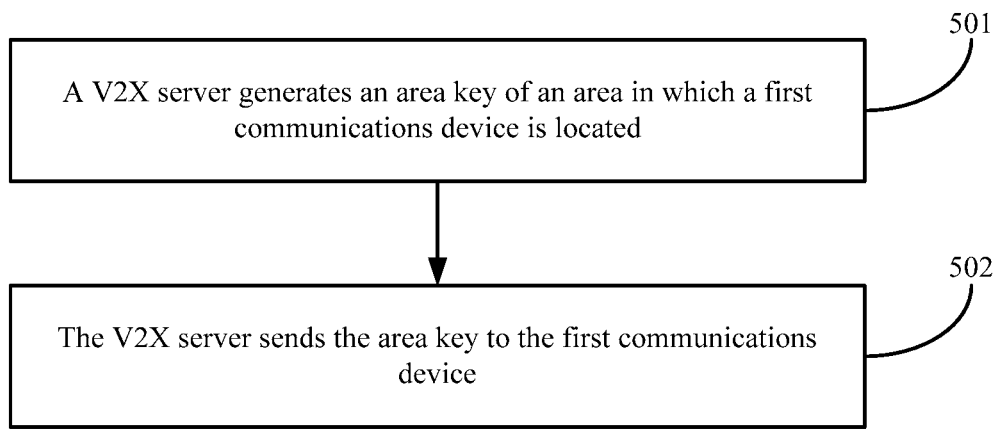
FIG. 5 is a schematic flowchart of another communication method according to an embodiment of the present invention.

Referring to FIG. 5, FIG. 5 is a schematic flowchart of another communication method according to an embodiment of the present invention. The communication method described in FIG. 5 is mainly described from a side of a V2X server. As shown in FIG. 5, the method may include the following steps.

Step 501: A V2X server generates an area key of an area in which a first communications device is located.

In this embodiment of the present invention, the area key is generated and managed by the V2X server.

In this embodiment of the present invention, the first communications device may include but is not limited to an eNB, an MME, UE, or the like.

Step 502. The V2X server sends the area key to the first communications device.

In some embodiments, the sending, by the V2X server, the area key to the first communications device may include:
sending, by the V2X server to an eNB, area key information of an area in which the eNB is located and area key information of an adjacent area of the area in which the eNB is located.

In this implementation, the area key is allocated to UE by the eNB.

After generating the area key, the V2X server may actively send the area key information to the eNB according to the area in which the eNB is located. The eNB allocates the area key information to corresponding UE.

In some embodiments, the sending, by the V2X server, the area key to the first communications device may include:
receiving, by the V2X server, an area key request message sent by the eNB; and
sending, by the V2X server, an area key response message to the eNB, where the area key response message includes area key information of an area in which the eNB is located and area key information of an adjacent area of the area in which the eNB is located.

In this implementation, the area key is allocated to UE by the eNB.

After generating the area key, the V2X server does not actively send the area key information to the eNB, but needs to send the area key information to the eNB after receiving the area key request message sent by the eNB. The eNB allocates the area key information to corresponding UE.

In some embodiments, the sending, by the V2X server, the area key to the first communications device may include:
receiving, by the V2X server, an area key request message sent by an MME, where the area key request message includes location information of the UE; and
sending, by the V2X server, an area key response message to the MME, where the area key response message includes area key information of an area corresponding to the location information of the UE and area key information of an adjacent area of the area.

In this implementation, the area key is allocated to the UE by the MME.

After the MME determines that the UE is allowed to perform a V2X service and the authentication on UE performed by the MME successes, the MME may send, to the V2X server, the area key request message that includes the location information of the UE, so as to obtain the area key information corresponding to the location information of the UE.

After receiving the area key request message sent by the MME, the V2X server may query, according to the location information of the UE that is included in the area key request message, for the area key information of the area corresponding to the location information of the UE and the area key information of the adjacent area of the area, add the area key information to the area key response message, and return the area key response message to the MME. The MME allocates the area key information to the corresponding UE.

In some embodiments, the sending, by the V2X server, the area key to the first communications device may include:
establishing, by the V2X server to UE, a security connection of a GBA or GBA push security mechanism;
receiving, by the V2X server, an area key request message sent by the UE, where the area key request message includes location information of the UE; and
sending, by the V2X server, an area key response message to the UE, where the area key response message includes an area key of an area corresponding to the location information of the UE and an area key of an adjacent area of the area.

In this implementation, the area key is allocated to the UE by the V2X server.

After the UE is attached successfully, the UE may establish the GBA (bootstrapping architecture) or GBA push security mechanism with the V2X server. After the GBA or GBA push security mechanism is successfully established, the UE may send, to the V2X server, an area key obtaining request that carries the location information of the UE. After receiving the area key obtaining request, the V2X server may query for the corresponding area key according to the location information of the UE that is included in the area key obtaining request, and send, to the UE, area key information of the area corresponding to the location information of the UE and area key information of the adjacent area.

In a process of establishing the GBA or GBA push security mechanism between the UE and the V2X server, the V2X server plays a role of a NAF (network application function) entity. For a specific process, refer to related descriptions in a process of establishing a GBA or GBA push security mechanism in the prior art. Details are not described in this embodiment of the present invention.

In some embodiments, in this embodiment of the present invention, the area key information may include a correspondence between an area key, an area key ID, and an area ID.

In this embodiment of the present invention, for specific implementations of allocating the area key to the UE by the eNB, allocating the area key to the UE by the MME, and performing by the UE, security protection on a V2X message by using the area key information, refer to related descriptions in the method process shown in FIG. 2 or FIG. 3. Details are not described herein.

Figure 6:
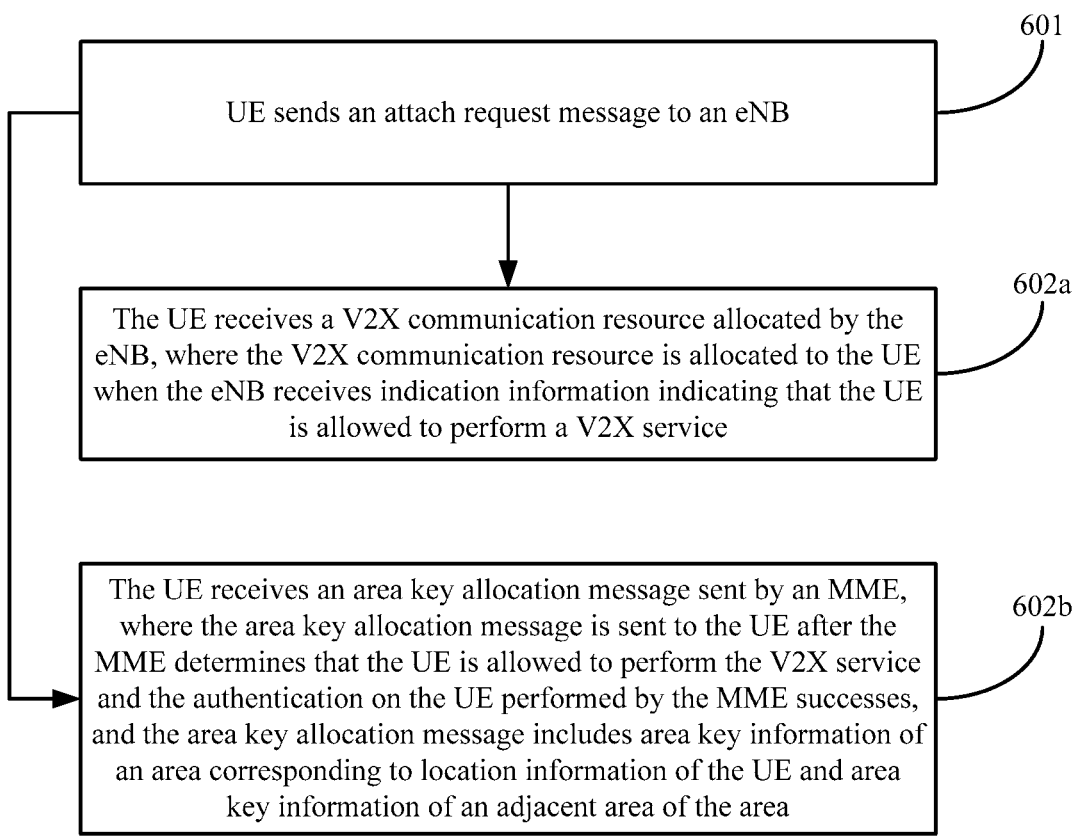
FIG. 6 is a schematic flowchart of another communication method according to an embodiment of the present invention.

Referring to FIG. 6, FIG. 6 is a schematic flowchart of another communication method according to an embodiment of the present invention. The communication method described in FIG. 6 is mainly described from a UE side. As shown in FIG. 6, the method may include the following steps.

Step 601: UE sends an attach request message to an eNB, and proceeds to step 602*a* or 602*b*.

In this embodiment of the present invention, when the UE starts up and the UE is in a coverage area of the eNB, the UE may send the attach request message to the eNB. The attach request message includes an identity of the UE and location information of the UE. The identity information may include but is not limited to an IMSI or a TMSI.

In some embodiments, the attach request message may further include V2X indication information. The V2X indication information is used to indicate that the UE is of a V2X type.

Step 602*a*: The UE receives a V2X communication resource allocated by the eNB, where the V2X communication resource is allocated to the UE when the eNB receives indication information indicating that the UE is allowed to perform a V2X service.

In this embodiment of the present invention, after receiving the attach request message (a first attach request message) sent by the UE, the eNB may send a second attach request message to an MME, and allocate the V2X communication resource to the UE when receiving the indication information that is sent by the MME and that indicates that the UE is allowed to perform the V2X service.

For related implementations of receiving, by the MME, the attach request message sent by the eNB, and sending, by the MME to the eNB, the indication information indicating that the UE is allowed to perform the V2X service, refer to related descriptions of the process shown in FIG. 2 or FIG. 3. Details are not described herein.

In some embodiments, the receiving, by the UE, a V2X communication resource allocated by the eNB may include:

receiving, by the UE, an area key allocation message sent by the eNB, where the area key allocation message includes area key information of an area in which the eNB is located and area key information of an adjacent area of the area in which the eNB is located.

In this implementation, the V2X communication resource may include the area key information. For a specific implementation of allocating, by the eNB, the area key information to the UE, refer to related descriptions in the method process shown in FIG. 3. Details are not described herein.

In some embodiments, after the sending, by UE, an attach request message to an eNB, the method may further include:

sending, by the UE, an area key request message to the eNB; and receiving, by the UE, an area key response message sent by the eNB, where the area key response message includes area key information of an area in which the eNB is located and area key information of an adjacent area of the area in which the eNB is located.

In this implementation, the V2X communication resource allocated to the UE by the eNB does not include the area key information. When the UE attempts to obtain an area key, the UE needs to send the area key request message to the eNB, receive the area key response message returned by the eNB, and obtain the area key information included in the area key response message.

Step 602*b*: The UE receives an area key allocation message sent by an MME, where the area key allocation message is sent to the UE after the MME determines that the UE is allowed to perform a V2X service and the authentication on the UE performed by the MME successes, and the area key allocation message includes area key information of an area corresponding to location information of the UE and area key information of an adjacent area of the area.

In this embodiment of the present invention, after the MME determines that the UE is allowed to perform the V2X service and the authentication on the UE performed by the MME successes, the MME may allocate the area key information to the UE.

For specific implementations of determining, by the MME, that the UE is allowed to perform the V2X service, and performing authentication on the UE by the MME, refer to related implementations in the method process shown in FIG. 2. Details are not described herein.

In some embodiments, in this embodiment of the present invention, the area key information may include a correspondence between an area key, an area key ID, and an area ID.

Further, in this embodiment of the present invention, after the area key information is allocated to the UE, the UE may further send a V2X message to a receive end. The V2X message includes message content, the area key ID, the area ID, and a message verification value. The message verification value is obtained by performing, by using the area key corresponding to the area key ID and the area ID, integrity protection on the message content, the area key ID, and the area ID.

In some embodiments, the message content may be message content encrypted by using the area key. For a specific implementation of the message content, refer to related descriptions in the method process shown in FIG. 2 or FIG. 3. Details are not described herein.

Figure 7:
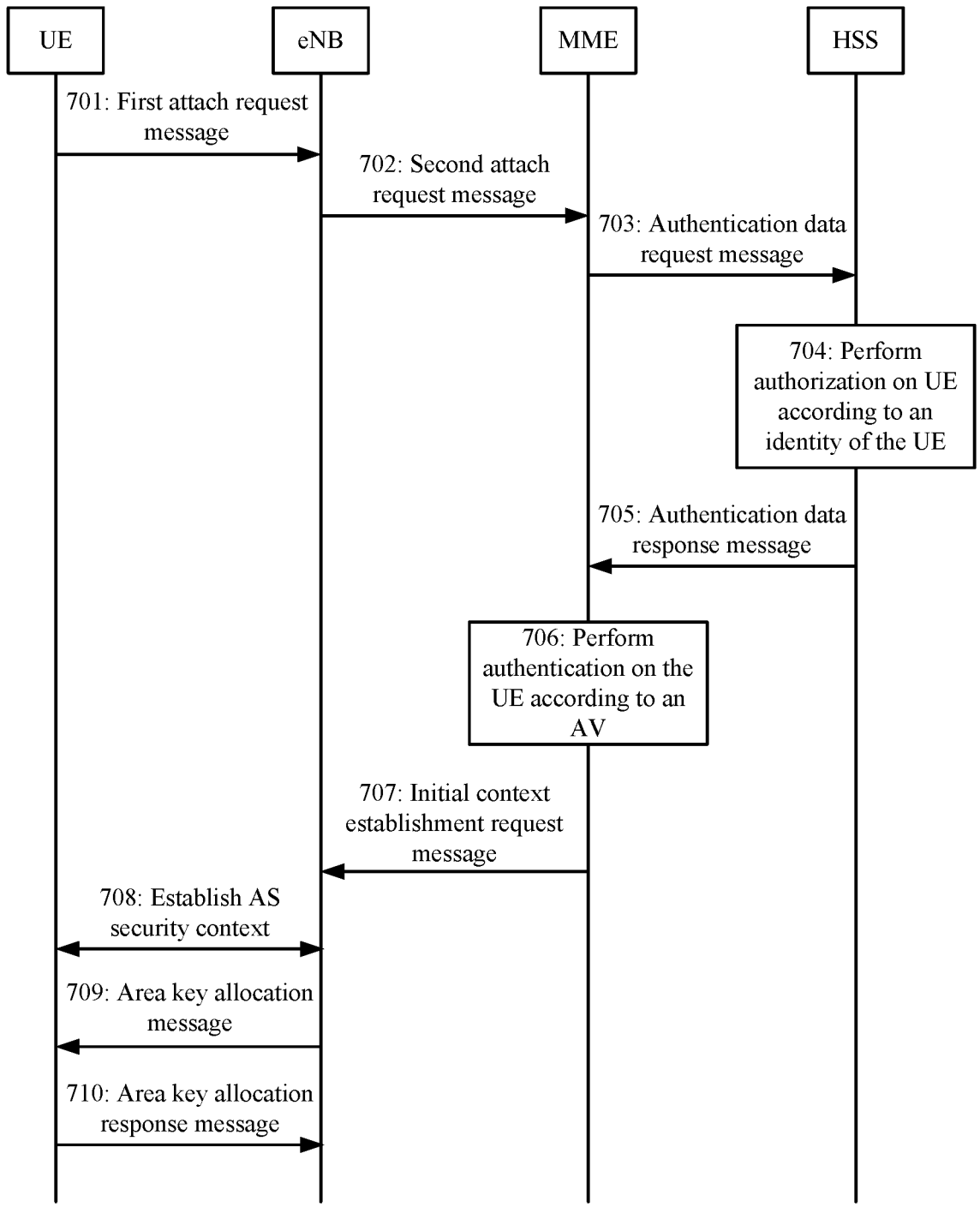
FIG. 7 is a schematic flowchart of another communication method according to an embodiment of the present invention.

Referring to FIG. 7, FIG. 7 is a schematic flowchart of another communication method according to an embodiment of the present invention. The communication method described in FIG. 7 is mainly described from the following four aspects: UE, an eNB, an MME, and an HSS. As shown in FIG. 7, the method may include the following steps.

Step 701: UE sends a first attach request message to an eNB.

In this embodiment of the present invention, when the UE starts up and the UE is in a coverage area of the eNB, the UE may send the attach request message to the eNB. The attach request message includes an identity of the UE. The identity information may include but is not limited to an IMSI or a TMSI.

In some embodiments, the first attach request message may further include V2X indication information.

Step 702: The eNB sends a second attach request message to an MME.

In this embodiment of the present invention, after receiving the first attach request message sent by the UE, the eNB may send the second attach request message to the MME.

In some embodiments, the second attach request message may further include the V2X indication information.

Step 703: The MME sends an authentication data request message to an HSS, where the authentication data request message includes an identity of the UE.

In this embodiment of the present invention, after receiving the second attach request message sent by the eNB, the MME may send the authentication data request message to the HSS, to request the HSS to perform authorization on the UE.

In some embodiments, when the second attach request message includes the V2X indication information, the MME may determine, according to the V2X indication information, that the UE is of a V2X type, add the V2X indication information to the authentication data request message, and send the authentication data request message to the HSS.

Step 704: The HSS performs authorization on the UE according to the identity of the UE.

In this embodiment of the present invention, after receiving the authentication data request message sent by the MME, the HSS may query for subscription information of the UE according to the identity of the UE that is included in the authentication data request message, and perform authorization on the UE according to the subscription information.

In this embodiment of the present invention, the performing, by the HSS, authorization on the UE is mainly determining whether the UE is allowed to perform a V2X service. When the HSS determines that the UE is allowed to perform the V2X service, the HSS may send, to the MME, an authentication data response message that includes AVs.

Step 705: The HSS sends, to the MME, an authentication data response message that includes an AV.

In some embodiments, in this embodiment of the present invention, when the attach request message sent by the UE does not include the V2X indication information, the authentication data request message received by the HSS does not include the V2X indication information either. In this case, after the HSS determines that the UE is allowed to perform the V2X service, the authentication data response message sent to the MME by the HSS may further include the V2X indication information, so that the MME learns that the UE is of the V2X type.

In some embodiments, when receiving the authentication data response message sent by the HSS, the MME may determine that the UE is allowed to perform the V2X service.

In some embodiments, the authentication data response message may further include indication information indicating that the UE is allowed to perform the V2X service. In this implementation, only when receiving the authentication data response message sent by the HSS and determining that the authentication data response message includes the indication information indicating that the UE is allowed to perform the V2X service, the MME may determine that the UE is allowed to perform the V2X service.

Step 706: The MME performs authentication on the UE according to the AV.

In this embodiment of the present invention, after receiving the authentication data response message sent by the HSS, the MME may perform authentication on the UE according to the AV included in the authentication data response message.

In this embodiment of the present invention, when the authentication on the UE performed by the MME successes, the MME may send, to the eNB, the indication information indicating that the UE is allowed to perform the V2X service.

In some embodiments, the indication information may be included in an initial context establishment request message.

Step 707: The MME sends an initial context establishment request message to the eNB, where the initial context establishment request message includes indication information indicating that the UE is allowed to perform a V2X service.

Step 708: The eNB establishes AS security context with the UE.

In this embodiment of the present invention, after receiving the indication information that is sent by the MME and that indicates that the UE is allowed to perform the V2X service, the eNB may establish the AS security context with the UE.

After successfully establishing the AS security context with the UE, the eNB may send an initial context establishment response message to the MME.

Step 709: The eNB sends an area key allocation message to the UE, where the area key allocation message includes area key information.

In this embodiment of the present invention, after receiving the indication information that is sent by the MME and that indicates that the UE is allowed to perform the V2X service, the eNB may allocate an area key to the UE.

In some embodiments, the area key allocation message includes a correspondence between an area key, an area key ID, and an area ID that are of an area in which the eNB is located, and a correspondence between an area key, an area key ID, and an area ID that are of an adjacent area.

In some embodiments, the eNB may protect the area key allocation message by using the AS security context, and send a protected area key allocation message to the UE.

Step 710: The UE sends an area key allocation response message to the eNB.

In this embodiment of the present invention, after receiving the area key allocation message sent by the eNB, the UE may store the area key information included in the area key allocation response message, and send the area key allocation response message to the eNB.

In some embodiments, when the area key allocation message includes the correspondence between the area key, the area key ID, and the area ID that are of the area in which the eNB is located, and the correspondence between the area key, the area key ID, and the area ID that are of the adjacent area, the UE may store the correspondences.

In this embodiment of the present invention, after receiving the area key allocation message sent by the eNB, the UE may store the correspondence between the area key, the area key ID, and the area ID that are of the area in which the eNB is located, and the correspondence between the area key, the area key ID, and the area ID that are of the adjacent area, where the correspondences are included in the area key allocation message. When the UE needs to perform V2X communication, transmit-end UE may perform integrity protection on a V2X message by using an area key of an area in which the transmit-end UE is currently located, and add, to the V2X message, an area key ID and an area ID of the area in which the transmit-end UE is currently located. For example, the transmit-end UE may further encrypt message content of the V2X message by using the area key of the area in which the transmit-end UE is currently located (that is, the V2X message may include encrypted message content, the area key ID, and the area ID).

After receiving the V2X message sent by the transmit end, receive-end UE may query, according to the area key ID and the area ID that are included in the V2X message, for a correspondence that is between an area key, an area key ID, and an area ID and that is stored by the receive-end UE, so as to determine an area key corresponding to both the area key ID and the area ID that are included in the V2X message, and perform integrity verification on the V2X message according to the area key. In some embodiments, when the message content included in the V2X message is the encrypted message content, the receive-end UE may decrypt the encrypted message content according to the area key.

In some embodiments, in this embodiment of the present invention, the area key may be generated and managed by the eNB.

Correspondingly, the schematic flowchart of the method shown in FIG. 7 may further include the following step (not shown in FIG. 7) before step 701:

Step 700*a*: An eNB generates and manages an area key.

In some embodiments, in this embodiment of the present invention, the area key may be generated and managed by a V2X server, and configured onto a corresponding eNB.

Correspondingly, the schematic flowchart of the method shown in FIG. 7 may further include the following step (not shown in FIG. 5) before step 701:

Step 700*b*: A V2X server generates and manages an area key, and configures the area key onto a corresponding eNB.

In some embodiments, in this embodiment of the present invention, V2X may be deployed as an independent entity, or may be deployed as a functional entity of the HSS or the MME.

In this embodiment of the present invention, in the communication method described in FIG. 7, the HSS may perform authorization on the UE according to the subscription information corresponding to the identity of the UE, determine whether the UE is allowed to perform the V2X service, and when the UE is allowed to perform the V2X service, send the authentication data response message to the MME, so that after mutual authentication between the MME and the UE succeeds, the MME sends, to the eNB, the indication information indicating that the UE is allowed to perform the V2X service, and the eNB allocates the area key to the UE. Further, the UE performs security protection on the V2X message by using the area key. In an aspect, validity of the identity of the UE is ensured by performing authorization on the UE by the HSS, and therefore, the UE does not need to add a certificate to the V2X message. In another aspect, because one area has a same area key, a security certificate does not need to be separately configured and managed for each UE in the same area, thereby reducing workload of a CA.

Figure 8:
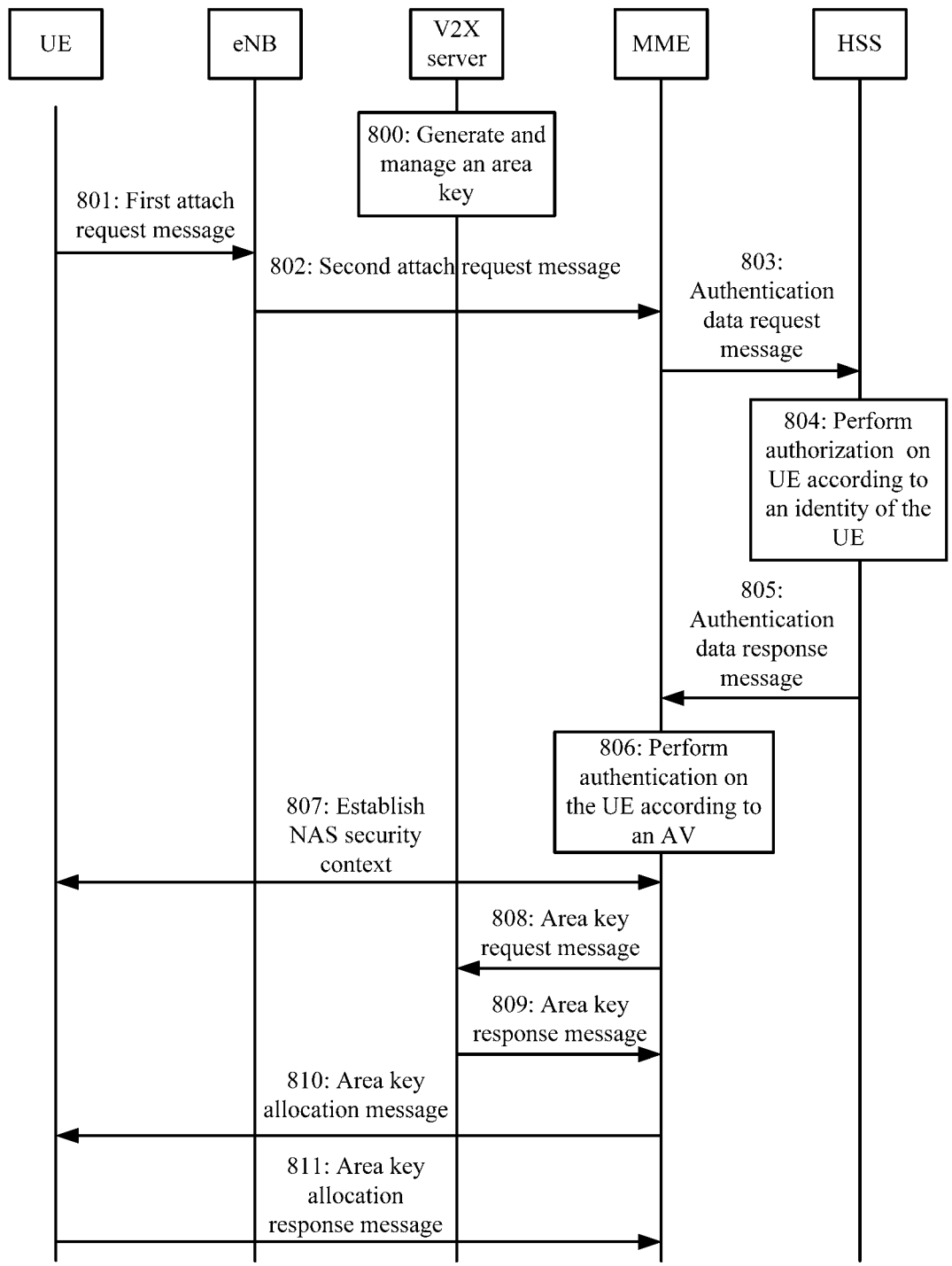
FIG. 8 is a schematic flowchart of another communication method according to an embodiment of the present invention.

Referring to FIG. 8, FIG. 8 is a schematic flowchart of another communication method according to an embodiment of the present invention. The communication method described in FIG. 8 is mainly described from the following five aspects: UE, an eNB, an MME, a V2X server, and an HSS. As shown in FIG. 8, the method may include the following steps.

Step 800: A V2X server generates and manages an area key.

In this embodiment of the present invention, the area key is generated and managed by the V2X server.

Step 801: UE sends a first attach request message to an eNB.

In this embodiment of the present invention, when the UE starts up and the UE is in a coverage area of the eNB, the UE may send the attach request message to the eNB. The attach request message includes an identity of the UE and location information of the UE. The identity information may include but is not limited to an IMSI or a TMSI.

In some embodiments, the first attach request message may further include V2X indication information.

Step 802: The eNB sends a second attach request message to an MME.

In this embodiment of the present invention, after receiving the first attach request message sent by the UE, the eNB needs to send the second attach request message to the MME.

In some embodiments, the second attach request message may further include the V2X indication information.

Step 803: The MME sends an authentication data request message to an HSS, where the authentication data request message includes an identity of the UE.

In this embodiment of the present invention, after receiving the second attach request message sent by the eNB, the MME may send the authentication data request message to the HSS, to request the HSS to perform authorization on the UE.

In some embodiments, when the attach request message includes the V2X indication information, the MME may determine, according to the V2X indication information, that the UE is of a V2X type, add the V2X indication information to the authentication data request message, and send the authentication data request message to the HSS.

Step 804: The HSS performs authorization on the UE according to the identity of the UE.

In this embodiment of the present invention, after receiving the authentication data request message sent by the MME, the HSS may query for subscription information of the UE according to the identity of the UE that is included in the authentication data request message, and perform authorization on the UE according to the subscription information.

In this embodiment of the present invention, the performing, by the HSS, authorization on the UE is mainly determining whether the UE is allowed to perform a V2X service. When the HSS determines that the UE is allowed to perform the V2X service, the HSS may send, to the MME, an authentication data response message that includes AVs.

Step 805: The HSS sends, to the MME, an authentication data response message that includes an AV.

In some embodiments, in this embodiment of the present invention, when the attach request message sent by the UE does not include the V2X indication information, the authentication data request message received by the HSS does not include the V2X indication information either. In this case, after the HSS determines that the UE is allowed to perform the V2X service, the authentication data response message sent to the MME by the HSS may further include the V2X indication information, so that the MME learns that the UE is of the V2X type.

In some embodiments, when receiving the authentication data response message sent by the HSS, the MME may determine that the UE is allowed to perform the V2X service.

In some embodiments, the authentication data response message may further include indication information indicating that the UE is allowed to perform the V2X service. In this implementation, only when receiving the authentication data response message sent by the HSS and determining that the authentication data response message includes the indication information indicating that the UE is allowed to perform the V2X service, the MME may determine that the UE is allowed to perform the V2X service.

Step 806: The MME performs authentication on the UE according to the AV.

In this embodiment of the present invention, after receiving the authentication data response message sent by the HSS, the MME may perform authentication on the UE according to the AV included in the authentication data response message.

Step 807: The MME establishes NAS security context with the UE.

In this embodiment of the present invention, after mutual authentication between the MME and the UE succeeds, the MME may further establish the NAS security context with the UE. For a specific implementation of establishing, by the MME, the NAS security context with the UE, refer to a related process of establishing a NAS security context in the prior art. Details are not described herein.

Step 808: The MME sends an area key request message to the V2X server, where the area key request message includes location information of the UE.

In this embodiment of the present invention, after determining that the UE is allowed to perform the V2X service and the mutual authentication between the MME and the UE succeeds, the MME may send the area key request message to the V2X server, to request an area key for the UE.

Step 809: The V2X server sends an area key response message to the MME according to the location information of the UE.

In this embodiment of the present invention, after receiving the area key request message sent by the MME, the V2X server may query, according to the location information of the UE that is included in the area key request message, for an area key maintained by the V2X server, so as to determine an area key of an area corresponding to the location information of the UE and an area key of an adjacent area, add the area keys to the area key response message, and send the area key response message to the MME.

In some embodiments, the area key response message may include a correspondence between the area key, an area key ID, and an area ID that are of the area corresponding to the location information of the UE, and a correspondence between the area key, an area key ID, and an area ID that are of the adjacent area.

Step 810: The MME sends an area key allocation message to the UE, where the area allocation message includes area key information.

In this embodiment of the present invention, after receiving the area key response message sent by the V2X server, the MME may send, to the UE, the area key information included in the area key response message.

In some embodiments, when the area key response message includes the correspondence between the area key, the area key ID, and the area ID that are of the area corresponding to the location information of the UE, and the correspondence between the area key, the area key ID, and the area ID that are of the adjacent area, the area key allocation message sent to the UE by the MME also includes the correspondences.

In some embodiments, the MME may protect the area key allocation message by using the NAS security context, and send a protected area key allocation message to the UE.

Step 811: The UE sends an area key allocation response message to the MME.

In this embodiment of the present invention, after receiving the area key allocation message sent by the MME, the UE may store the area key information included in the area key allocation response message, and send the area key allocation response message to the MME.

In some embodiments, when the area key allocation message includes the correspondence between the area key, the area key ID, and the area ID that are of the area corresponding to the location information of the UE, and the correspondence between the area key, the area key ID, and the area ID that are of the adjacent area, the UE may store the correspondences.

In this embodiment of the present invention, after receiving the area key allocation message sent by the MME, the UE may store the correspondence between the area key, the area key ID, and the area ID that are of the area corresponding to the location information of the UE, and the correspondence between the area key, the area key ID, and the area ID that are of the adjacent area, where the correspondences are included in the area key allocation message. When the UE needs to perform V2X communication, transmit-end UE may perform integrity protection on a V2X message by using an area key of an area in which the transmit-end UE is currently located, and add, to the V2X message, an area key ID and an area ID of the area in which the transmit-end UE is currently located. For example, the transmit-end UE may further encrypt message content of the V2X message by using the area key of the area in which the transmit-end UE is currently located (that is, the V2X message may include encrypted message content, the area key ID, and the area ID).

After receiving the V2X message sent by the transmit end, receive-end UE may query, according to the area key ID and the area ID that are included in the V2X message, for a correspondence that is between an area key, an area key ID, and an area ID and that is stored by the receive-end UE, so as to determine an area key corresponding to both the area key ID and the area ID that are included in the V2X message, and perform integrity verification on the V2X message according to the area key. In some embodiments, when the message content included in the V2X message is the encrypted message content, the receive-end UE may decrypt the encrypted message content according to the area key.

In this embodiment of the present invention, in the communication method described in FIG. 8, the HSS may perform authorization on the UE according to the subscription information corresponding to the identity of the UE, determine whether the UE is allowed to perform the V2X service, and when the UE is allowed to perform the V2X service, send the authentication data response message to the MME, so that after the mutual authentication between the MME and the UE succeeds, the MME requests, from the V2X server, the area key corresponding to the location information of the UE, and sends the area key to the UE. Further, during V2X communication, the UE performs security protection on the V2X message by using the area key. On the one hand, validity of the identity of the UE is ensured by performing authorization on the UE by the HSS, and therefore, the UE does not need to add a certificate to the V2X message; on the other hand, because one area has a same area key, a security certificate does not need to be separately configured and managed for each UE in the same area, thereby reducing workload of a CA. In addition, the V2X server globally generates, manages, and allocates the area key, thereby avoiding reuse of the area key.

Figure 9:
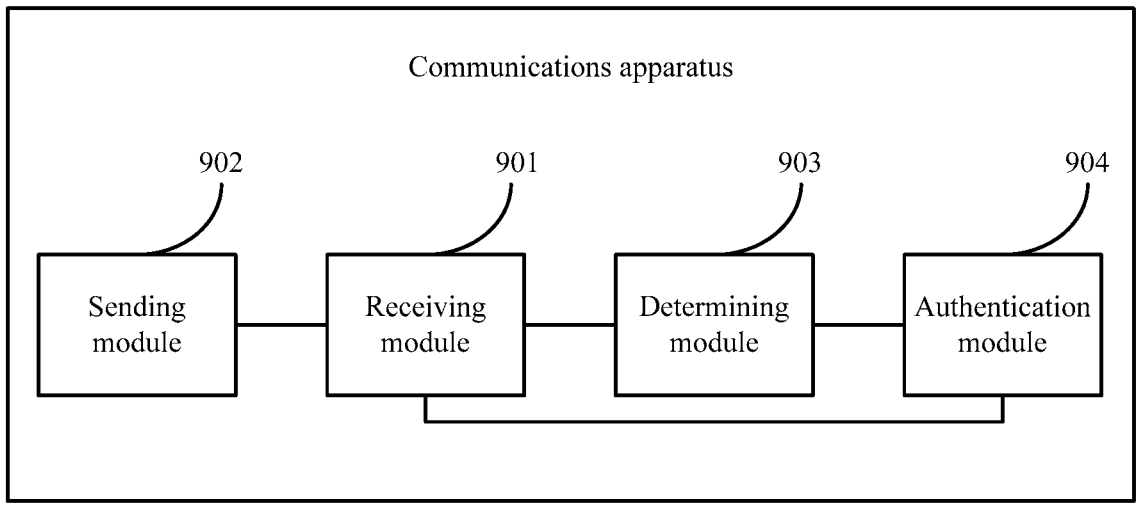
FIG. 9 is a schematic structural diagram of a communications apparatus according to an embodiment of the present invention.

Referring to FIG. 9, FIG. 9 is a schematic structural diagram of a communications apparatus according to an embodiment of the present invention. The communications apparatus may be applied to the MME in the foregoing method embodiments. As shown in FIG. 9, the communications apparatus may include:

a receiving module 901, configured to receive an attach request message sent by an evolved NodeB eNB, where the attach request message is used by user equipment UE to request to attach to a network, and the attach request message includes an identity of the UE;

a sending module 902, configured to send, to a home subscriber server HSS according to the attach request message, an authentication data request message that includes the identity of the UE, so that the HSS performs authorization on the UE according to the identity of the UE, where the receiving module 901 is further configured to receive an authentication data response message that includes an authentication vector AV and that is sent by the HSS, where the authentication data response message is used to indicate that the authorization on the UE succeeds;

a determining module 903, configured to determine, according to the authentication data response message, that the UE is allowed to perform a vehicle-to-everything V2X service; and an authentication module 904, configured to perform authentication on the UE according to the AV.

In this embodiment of the present invention, after receiving the attach request message sent by the eNB, the MME needs to determine whether the UE is allowed to perform the V2X service.

In this embodiment of the present invention, after receiving the attach request message that includes the identity of the UE and that is sent by the eNB, the MME may send, to the HSS, the authentication data request message that includes the identity of the UE. After receiving the authentication data request message sent by the MME, the HSS may query for corresponding subscription information according to the identity of the UE, and determine, according to the subscription information, whether the UE is allowed to perform the V2X service. When the HSS determines that the UE is allowed to perform the V2X service, the HSS may send, to the MME, the authentication data response message that includes the AV. The identity of the UE may include but is not limited to an IMSI or a TMSI of the UE, or the like.

After receiving the authentication data response message sent by the HSS, the MME may perform mutual authentication with the UE according to the authentication data response message. For a specific implementation of performing authentication on the UE by the MME, refer to a related implementation of performing authentication on UE by an MME in the prior art. Details are not described in this embodiment of the present invention.

In some embodiments, the attach request message further includes V2X indication information, where the V2X indication information is used to indicate that the UE is of a V2X type.

Correspondingly, the sending module 902 may be specifically configured to send, to the HSS according to the attach request message, the authentication data request message that includes the identity of the UE and the V2X indication information, so that the HSS determines, according to the identity of the UE, whether the UE is allowed to perform the V2X service.

In some embodiments, the determining module 903 may be specifically configured to determine, according to the authentication data response message and the V2X indication information that is included in the attach request message, that the UE is allowed to perform the V2X service.

In this embodiment, when the attach request message includes a V2X indication information, the MME may determine that the UE is of the V2X type. Further, when the MME receives the authentication data response message used to indicate that the authorization on the UE succeeds, the MME may determine that the UE is allowed to perform the V2X service.

In some embodiments, the authentication data response message further includes V2X indication information, where the V2X indication information is used to indicate that the UE is of a V2X type.

Correspondingly, the determining module 903 may be specifically configured to determine, according to the authentication data response message and the V2X indication information that is included in the authentication data response message, that the UE is allowed to perform the V2X service.

In this embodiment, when receiving the authentication data response message sent by the HSS, the MME may determine that the authorization on the UE succeeds. Further, the MME may determine, according to the V2X indication information included in the authentication data response message, that the UE is of the V2X type. Therefore, the MME may determine that the UE is allowed to perform the V2X service.

In some embodiments, the sending module 902 may be further configured to: after the authentication on the UE performed by the authentication module successes, send, to the eNB, indication information indicating that the UE is allowed to perform the V2X service, so that the eNB allocates a V2X communication resource to the UE.

In some embodiments, the attach request message further includes location information of the UE.

Correspondingly, the sending module 902 may be further configured to send, to a V2X server, an area key request message that includes the location information of the UE.

The receiving module 901 may be further configured to receive an area key response message sent by the V2X server, where the area key response message includes area key information of an area corresponding to the location information of the UE and area key information of an adjacent area of the area.

The sending module 902 may be further configured to send an area key allocation message to the UE, where the area key allocation message includes the area key information of the area corresponding to the location information of the UE and the area key information of the adjacent area of the area, and the area key information is used by the UE in the area to perform security protection on a V2X message.

In this embodiment, the area key is generated and stored by the V2X server. After the MME determines that the UE is allowed to perform the V2X service and the authentication on the UE performed by the MME successes, the MME may send, to the V2X server, the area key request message that includes the location information of the UE, so as to obtain the area key information corresponding to the location information of the UE and the area key information of the adjacent area of the area. After obtaining the area key information corresponding to the location information of the UE and the area key information of the adjacent area of the area, the MME may allocate the area key information to the UE, so that the UE performs security protection on the V2X message according to the area key information.

In some embodiments, the area key information includes a correspondence between an area key, an area key ID, and an area ID.

Figure 10:
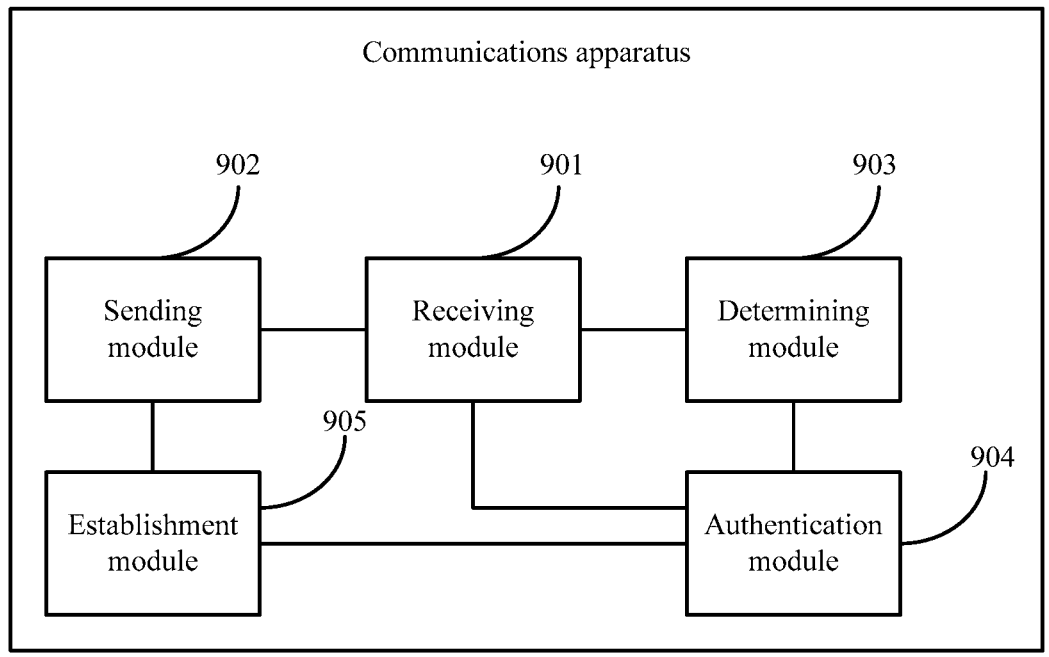
FIG. 10 is a schematic structural diagram of another communications apparatus according to an embodiment of the present invention.

Further referring to FIG. 10, FIG. 10 is a schematic structural diagram of another communications apparatus according to an embodiment of the present invention. The communications apparatus shown in FIG. 10 is obtained by optimizing the communications apparatus shown in FIG. 9. Compared with the communications apparatus shown in FIG. 9, the communications apparatus shown in FIG. 10 may further include:

an establishment module 905, configured to establish non-access stratum NAS security context with the UE after the authentication on the UE performed by the authentication module 904 successes.

Correspondingly, the sending module 902 may be specifically configured to send, to the UE, an area key allocation message that is protected by using the NAS security context.

Figure 11:
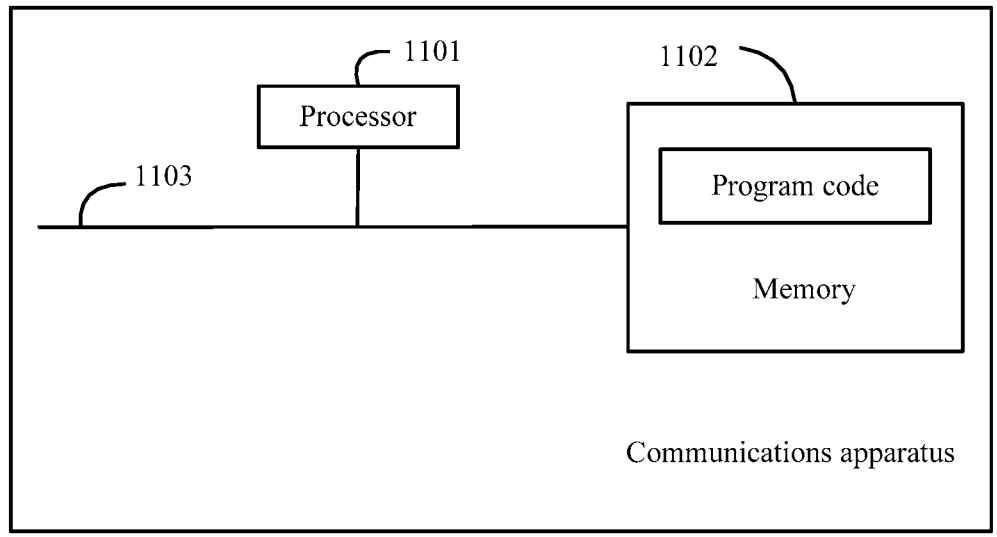
FIG. 11 is a schematic structural diagram of another communications apparatus according to an embodiment of the present invention.

Referring to FIG. 11, FIG. 11 is a schematic structural diagram of another communications apparatus according to an embodiment of the present invention. The communications apparatus shown in FIG. 11 may include a bus 1103, and a processor 1101 and a memory 1102 that are connected to the bus 1103. The memory 1102 stores program code. It may be understood by a person skilled in the art that a structure of the communications apparatus shown in the figure does not constitute a limitation on the present invention. The structure may be a bus structure or a star structure, and may include more or fewer components than those shown in the figure, or combine some components, or have a different component layout. In this embodiment of the present invention, the processor 1101 may perform the following operations by invoking the program code stored in the memory 1102:

receiving an attach request message sent by an eNB, where the attach request message is used by UE to request to attach to a network, and the attach request message includes an identity of the UE;

sending, to an HSS according to the attach request message, an authentication data request message that includes the identity of the UE, so that the HSS performs authorization on the UE according to the identity of the UE;

receiving an authentication data response message that includes an authentication vector AV and that is sent by the HSS, where the authentication data response message is used to indicate that the authorization on the UE succeeds; and determining, according to the authentication data response message, that the UE is allowed to perform a vehicle-to-everything V2X service, and performing authentication on the UE according to the AV.

In some embodiments, the attach request message further includes V2X indication information, where the V2X indication information is used to indicate that the UE is of a V2X type.

The sending, by the processor 1101 to an HSS according to the attach request message and by invoking the program code stored in the memory 1102, an authentication data request message that includes the identity of the UE, so that the HSS performs authorization on the UE according to the identity of the UE may specifically include:

sending, to the HSS according to the attach request message, the authentication data request message that includes the identity of the UE and the V2X indication information, so that the HSS determines, according to the identity of the UE, whether the UE is allowed to perform the V2X service.

In some embodiments, the determining, by the processor 1101 according to the authentication data response message and by invoking the program code stored in the memory 1102, that the UE is allowed to perform a V2X service may specifically include:

determining, according to the authentication data response message and the V2X indication information that is included in the attach request message, that the UE is allowed to perform the V2X service.

In some embodiments, the authentication data response message further includes V2X indication information, where the V2X indication information is used to indicate that the UE is of a V2X type.

The determining, by the processor 1101 according to the authentication data response message and by invoking the program code stored in the memory 1102, that the UE is allowed to perform a V2X service may specifically include:

determining, according to the authentication data response message and the V2X indication information that is included in the authentication data response message, that the UE is allowed to perform the V2X service.

In some embodiments, after performing authentication on the UE according to the AV and by invoking the program code stored in the memory 1102, the processor 1101 may further perform the following operation:

after the authentication on the UE performed by the MME successes, sending, by the MME to the eNB, indication information indicating that the UE is allowed to perform the V2X service, so that the eNB allocates a V2X communication resource to the UE.

In some embodiments, the attach request message further includes location information of the UE.

Correspondingly, after performing authentication on the UE according to the AV and by invoking the program code stored in the memory 1102, the processor 1101 may further perform the following operations:

sending, to a V2X server, an area key request message that includes the location information of the UE;

receiving an area key response message sent by the V2X server, where the area key response message includes area key information of an area corresponding to the location information of the UE and area key information of an adjacent area of the area; and sending an area key allocation message to the UE, where the area key allocation message includes the area key information of the area corresponding to the location information of the UE and the area key information of the adjacent area of the area, and the area key information is used by the UE in the area to perform security protection on a V2X message.

In some embodiments, the area key information includes a correspondence between an area key, an area key ID, and an area ID.

In some embodiments, after the authentication on the UE performed by the processor 1101 by invoking the program code stored in the memory 1102 successes, the operations further include:

establishing non-access stratum NAS security context with the UE.

The sending, by the processor 1101 by invoking the program code stored in the memory 1102, an area key allocation message to the UE may specifically include:

sending, to the UE, an area key allocation message that is protected by using the NAS security context.

Figure 12:
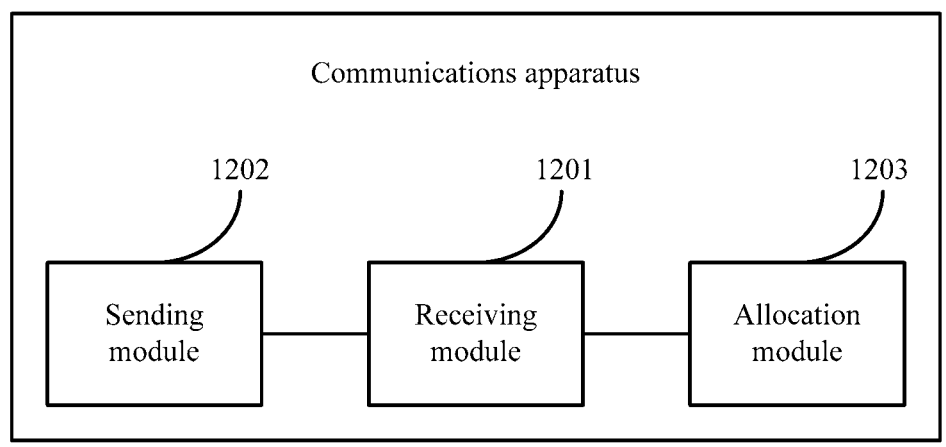
FIG. 12 is a schematic structural diagram of a communications apparatus according to an embodiment of the present invention.

Referring to FIG. 12, FIG. 12 is a schematic structural diagram of another communications apparatus according to an embodiment of the present invention. The communications apparatus may be applied to the eNB in the foregoing method embodiments. As shown in FIG. 12, the communications apparatus may include:

a receiving module 1201, configured to receive a first attach request message sent by user equipment UE;

a sending module 1202, configured to send a second attach request message to a mobility management entity MME according to the first attach request message, where the receiving module 1201 is further configured to receive indication information that is sent by the MME and that indicates that the UE is allowed to perform a vehicle-to-everything V2X service; and an allocation module 1203, further configured to allocate a V2X communication resource to the UE according to the indication information indicating that the UE is allowed to perform the V2X service.

In this embodiment of the present invention, when the UE needs to be attached to a network, the UE may send the attach request message to the eNB. After receiving the attach request message, the NB may send the second attach request message to the MME according to the first attach request message.

In some embodiments, after receiving the first attach request message sent by the UE, the eNB may not process the first attach request message, but directly forward the first attach request message to the MME. In this case, the first attach request message is the same as the second attach request message. Alternatively, after receiving the first attach request message sent by the UE, the eNB may perform corresponding processing on the first attach request message, re-encapsulate a processed message into the second attach request message, and forward the second attach request message to the MME. In this case, the first attach request message may be different from the second attach request message.

In some embodiments, the receiving module 1201 may be further configured to receive a V2X resource scheduling request sent by the UE, where the V2X resource scheduling request is used to request the V2X communication resource.

In some embodiments, the allocation module 1203 may be specifically configured to send an area key allocation message to the UE, where the area key allocation message includes area key information of an area in which the eNB is located and area key information of an adjacent area of the area in which the eNB is located, and the area key information is used by the UE in the area to perform security protection on a V2X communication message.

In some embodiments, the sending module 1202 may be further configured to send an area key request message to a V2X server.

The receiving module 1201 may be further configured to receive an area key response message sent by the V2X server, where the area key response message includes the area key information of the area in which the eNB is located and the area key information of the adjacent area of the area in which the eNB is located.

In some embodiments, the area key information includes a correspondence between an area key, an area key ID, and an area ID.

In some embodiments, the indication information indicating that the UE is allowed to perform the V2X service is included in an initial context establishment request message.

Figure 13:
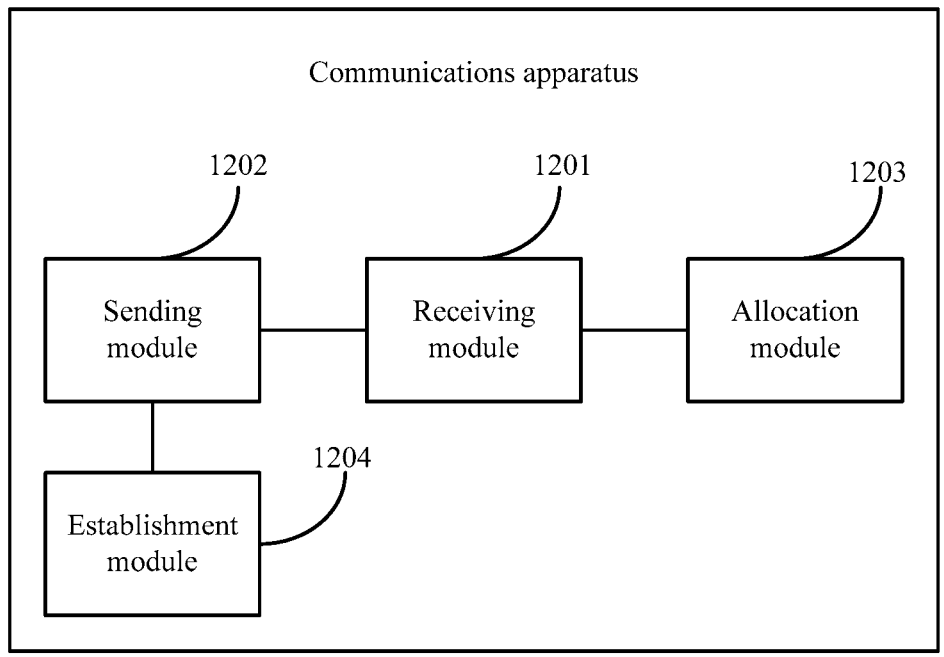
FIG. 13 is a schematic structural diagram of another communications apparatus according to an embodiment of the present invention.

Correspondingly, further referring to FIG. 13, FIG. 13 is a schematic structural diagram of another communications apparatus according to an embodiment of the present invention. The communications apparatus shown in FIG. 13 is obtained by optimizing the communications apparatus shown in FIG. 12. Compared with the communications apparatus shown in FIG. 12, the communications apparatus shown in FIG. 13 may further include:

an establishment module 1204, configured to establish access stratum AS security context with the UE.

The sending module 1202 may be specifically configured to send, to the UE, an area key allocation message that is protected by using the AS security context.

Figure 14:
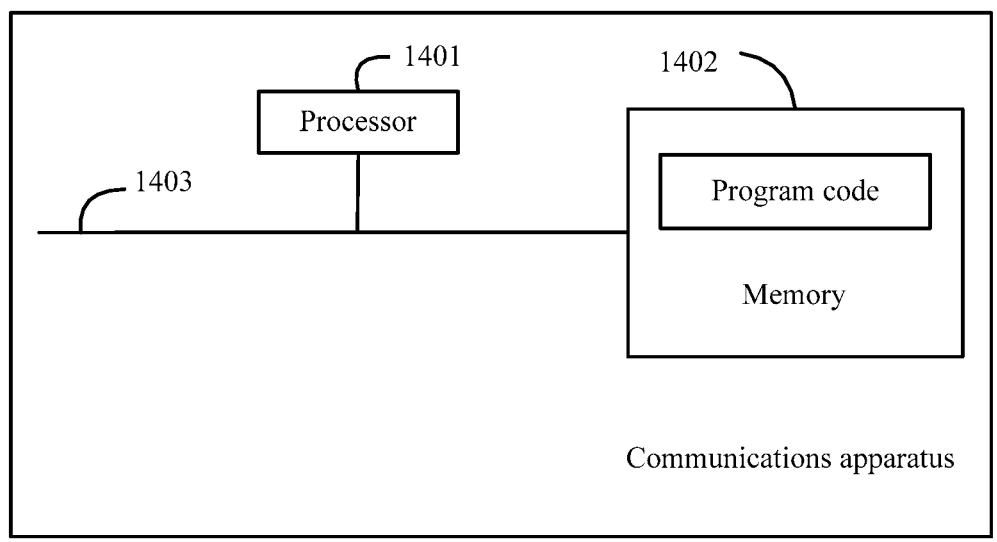
FIG. 14 is a schematic structural diagram of another communications apparatus according to an embodiment of the present invention.

Referring to FIG. 14, FIG. 14 is a schematic structural diagram of another communications apparatus according to an embodiment of the present invention. The communications apparatus shown in FIG. 14 may include a bus 1403, and a processor 1401 and a memory 1402 that are connected to the bus 1403. The memory 1402 stores program code. It may be understood by a person skilled in the art that a structure of the communications apparatus shown in the figure does not constitute a limitation on the present invention. The structure may be a bus structure or a star structure, and may include more or fewer components than those shown in the figure, or combine some components, or have a different component layout. In this embodiment of the present invention, the processor 1401 may perform the following operations by invoking the program code stored in the memory 1402:

receiving a first attach request message sent by the UE;

sending a second attach request message to an MME according to the first attach request message;

receiving indication information that is sent by the MME and that indicates that the UE is allowed to perform a V2X service; and allocating a V2X communication resource to the UE according to the indication information indicating that the UE is allowed to perform the V2X service.

In some embodiments, before allocating a V2X communication resource to the UE according to the indication information and by invoking the program code stored in the memory 1402, the processor 1401 may further perform the following operation:

receiving a V2X resource scheduling request sent by the UE, where the V2X resource scheduling request is used to request the V2X communication resource.

In some embodiments, the allocating, by the processor 1401, a V2X communication resource to the UE by invoking the program code stored in the memory 1402 includes:

sending an area key allocation message to the UE, where the area key allocation message includes area key information of an area in which the eNB is located and area key information of an adjacent area of the area in which the eNB is located, and the area key information is used by the UE in the area to perform security protection on a V2X communication message.

In some embodiments, before sending an area key allocation message to the UE by invoking the program code stored in the memory 1402, the processor 1401 may further perform the following operations:

sending an area key request message to a V2X server; and receiving an area key response message sent by the V2X server, where the area key response message includes area key information of an area in which the eNB is located and area key information of an adjacent area of the area in which the eNB is located.

In some embodiments, the area key information includes a correspondence between an area key, an area key ID, and an area ID.

In some embodiments, the indication information indicating that the UE is allowed to perform the V2X service is included in an initial context establishment request message.

After receiving, by invoking the program code stored in the memory 1402, the initial context establishment request message that is sent by the MME and that carries the indication information indicating that the UE is allowed to perform the V2X service, the processor 1401 may further perform the following operation:

establishing access stratum AS security context with the UE.

The sending, by the processor 1401 by invoking the program code stored in the memory 1402, an area key allocation message to the UE may specifically include:

sending, to the UE, an area key allocation message that is protected by using the AS security context.

Figure 15:
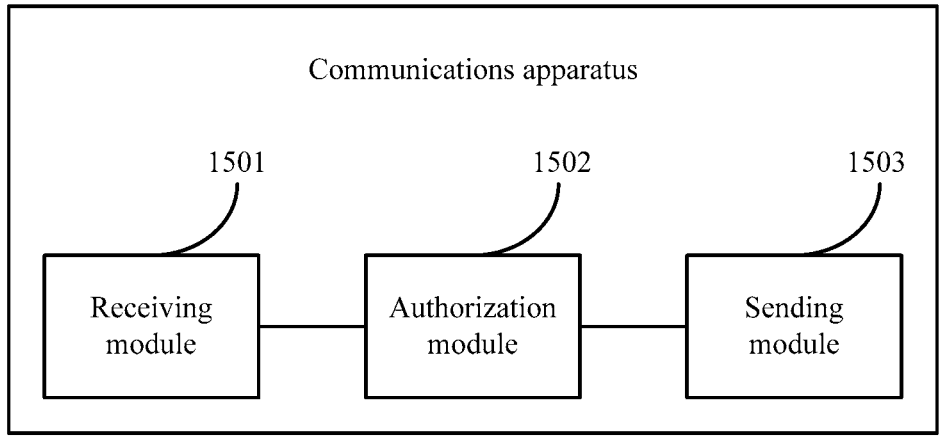
FIG. 15 is a schematic structural diagram of a communications apparatus according to an embodiment of the present invention.

Referring to FIG. 15, FIG. 15 is a schematic structural diagram of another communications apparatus according to an embodiment of the present invention. The communications apparatus may be applied to the HSS in the foregoing method embodiments. As shown in FIG. 15, the communications apparatus may include:

a receiving module 1501, configured to receive an authentication data request message that includes an identity of user equipment UE and that is sent by a mobility management entity MME;

an authorization module 1502, configured to perform authorization on the UE according to the identity of the UE; and a sending module 1503, configured to send, to the MME, an authentication data response message that includes an authentication vector AV, where the authentication data response message indicates that the authorization on the UE succeeds, so that the MME determines, according to the authentication data response message, that the UE is allowed to perform a vehicle-to-everything V2X service, and performs authentication on the UE according to the AV.

In this embodiment of the present invention, after receiving the authentication data request message sent by the MME, the HSS may query for subscription information of the UE according to the identity of the UE that is included in the authentication data request message, and perform authorization on the UE according to the subscription information.

In some embodiments, the authentication data request message includes V2X indication information, where the V2X indication information is used to indicate that the UE is of a V2X type.

Correspondingly, the authorization module 1502 may be specifically configured to determine, according to the identity of the UE, whether the UE is allowed to perform the V2X service.

In some embodiments, the authentication data request message does not include V2X indication information, and the authentication data response message further includes the V2X indication information, where the V2X indication information is used to indicate that the UE is of a V2X type.

Figure 16:
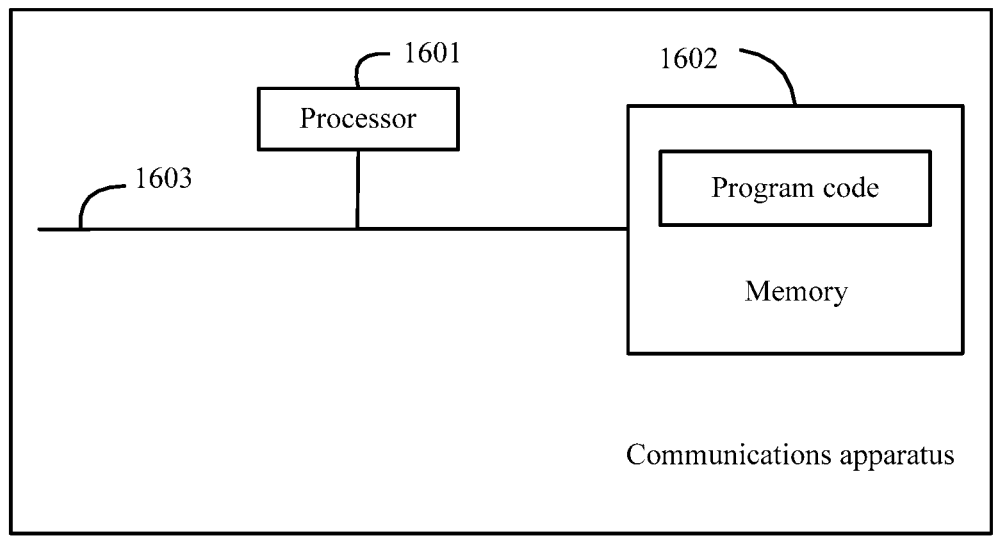
FIG. 16 is a schematic structural diagram of another communications apparatus according to an embodiment of the present invention.

Referring to FIG. 16, FIG. 16 is a schematic structural diagram of another communications apparatus according to an embodiment of the present invention. The communications apparatus shown in FIG. 16 may include a bus 1603, and a processor 1601 and a memory 1602 that are connected to the bus 1603. The memory 1602 stores program code. It may be understood by a person skilled in the art that a structure of the communications apparatus shown in the figure does not constitute a limitation on the present invention. The structure may be a bus structure or a star structure, and may include more or fewer components than those shown in the figure, or combine some components, or have a different component layout. In this embodiment of the present invention, the processor 1601 may perform the following operations by invoking the program code stored in the memory 1602:

receiving an authentication data request message that includes an identity of UE and that is sent by an MME;

performing authorization on the UE according to the identity of the UE; and sending, to the MME, an authentication data response message that includes an AV, where the authentication data response message indicates that the authorization on the UE succeeds, so that the MME determines, according to the authentication data response message, that the UE is allowed to perform a vehicle-to-everything V2X service, and performs authentication on the UE according to the AV.

In some embodiments, the authentication data request message includes V2X indication information, where the V2X indication information is used to indicate that the UE is of a V2X type.

The performing, by the processor 1601, authorization on the UE according to the identity of the UE and by invoking the program code stored in the memory 1602 may specifically include:

determining, according to the identity of the UE, whether the UE is allowed to perform the V2X service.

In some embodiments, the authentication data request message does not include V2X indication information, and the authentication data response message further includes the V2X indication information, where the V2X indication information is used to indicate that the UE is of a V2X type.

Figure 17:
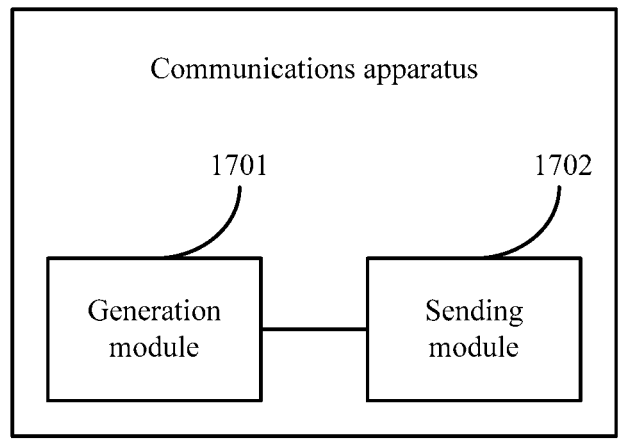
FIG. 17 is a schematic structural diagram of a communications apparatus according to an embodiment of the present invention.

Referring to FIG. 17, FIG. 17 is a schematic structural diagram of another communications apparatus according to an embodiment of the present invention. The communications apparatus may be applied to the V2X server in the foregoing method embodiments. As shown in FIG. 17, the communications apparatus may include:

a generation module 1701, configured to generate an area key of an area in which a first communications device is located; and a sending module 1702, configured to send the area key to the first communications device.

In this embodiment of the present invention, the area key is generated and managed by the V2X server.

In this embodiment of the present invention, the first communications device may include but is not limited to an eNB, an MME, UE, or the like.

In some embodiments, the sending module 1702 is specifically configured to send, to an evolved NodeB eNB, area key information of an area in which the eNB is located and area key information of an adjacent area of the area in which the eNB is located.

In some embodiments, the sending module 1702 may be specifically configured to send an area key response message to the eNB when the apparatus receives an area key request message sent by the eNB, where the area key response message includes the area key information of the area in which the eNB is located and the area key information of the adjacent area of the area in which the eNB is located.

In some embodiments, the sending module 1702 may be specifically configured to send an area key response message to a mobility management entity MME when the apparatus receives an area key request message sent by the MME and the area key request message includes location information of user equipment UE, where the area key response message includes area key information of an area corresponding to the location information of the UE and area key information of an adjacent area of the area.

Figure 18:
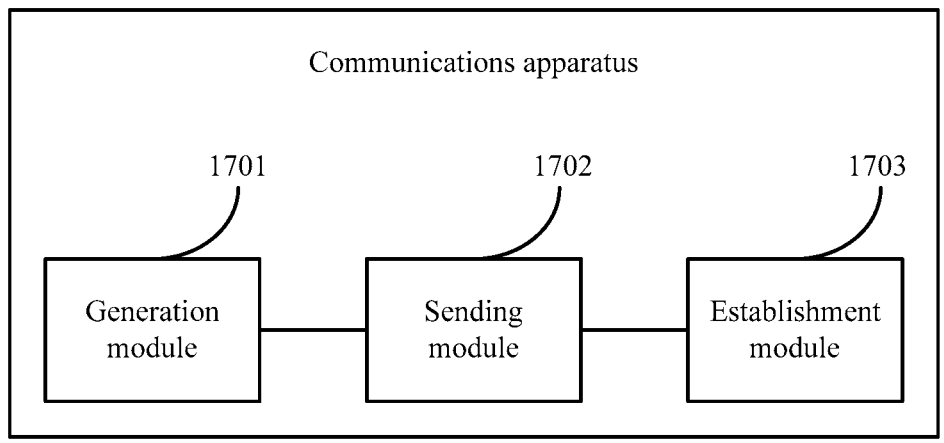
FIG. 18 is a schematic structural diagram of another communications apparatus according to an embodiment of the present invention.

In some embodiments, further referring to FIG. 18, FIG. 18 is a schematic structural diagram of another communications apparatus according to an embodiment of the present invention. The communications apparatus shown in FIG. 18 is obtained by optimizing the communications apparatus shown in FIG. 17. Compared with the communications apparatus shown in FIG. 17, the communications apparatus shown in FIG. 18 may further include:

an establishment module 1703, configured to establish, to user equipment UE, a security connection of a generic bootstrapping architecture GBA or GBA push security mechanism.

Correspondingly, the sending module 1702 may be specifically configured to send an area key response message to the UE when the apparatus receives an area key request message sent by the UE and the area key request message includes location information of the UE, where the area key response message includes area key information of an area corresponding to the location information of the UE and area key information of an adjacent area of the area.

In this embodiment, after the UE is attached successfully, the UE may establish the GBA or GBA push security mechanism with a V2X server. After the GBA or GBA push security mechanism is successfully established, the UE may send, to the V2X server, an area key obtaining request that carries the location information of the UE. After receiving the area key obtaining request, the V2X server may query for the corresponding area key according to the location information of the UE that is included in the area key obtaining request, and send, to the UE, area key information of the area corresponding to the location information of the UE and area key information of the adjacent area.

In a process of establishing the GBA or GBA push security mechanism between the UE and the V2X server, the V2X server plays a role of a NAF entity. For a specific process, refer to related descriptions in a process of establishing a GBA or GBA push security mechanism in the prior art. Details are not described in this embodiment of the present invention.

Figure 19:
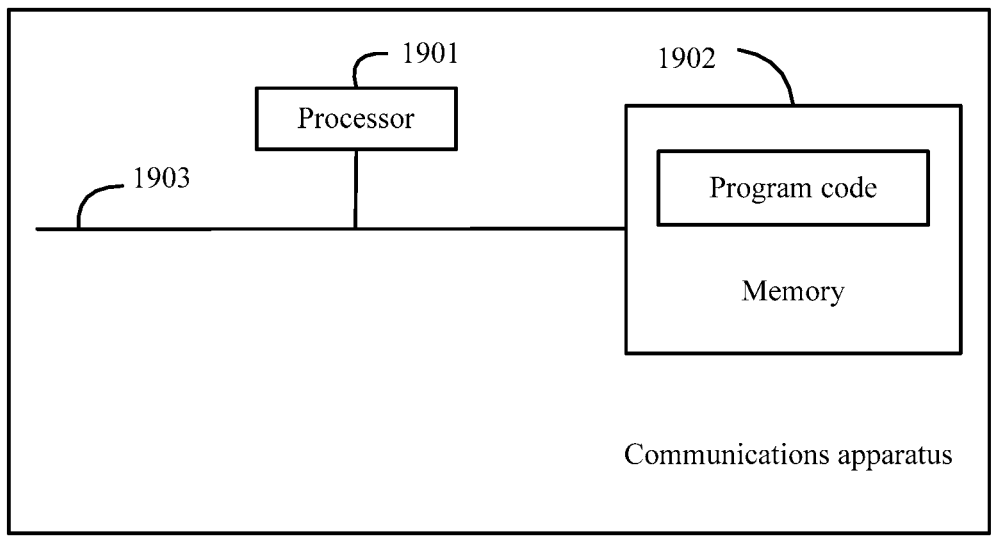
FIG. 19 is a schematic structural diagram of another communications apparatus according to an embodiment of the present invention.

Referring to FIG. 19, FIG. 19 is a schematic structural diagram of another communications apparatus according to an embodiment of the present invention. The communications apparatus shown in FIG. 19 may include a bus 1903, and a processor 1901 and a memory 1902 that are connected to the bus 1903. The memory 1902 stores program code. It may be understood by a person skilled in the art that a structure of the communications apparatus shown in the figure does not constitute a limitation on the present invention. The structure may be a bus structure or a star structure, and may include more or fewer components than those shown in the figure, or combine some components, or have a different component layout. In this embodiment of the present invention, the processor 1901 may perform the following operations by invoking the program code stored in the memory 1902:

generating an area key of an area in which a first communications device is located; and sending the area key to the first communications device.

In some embodiments, the sending, by the processor 1901, the area key to the first communications device by invoking the program code stored in the memory 1902 may specifically include:

sending, to an evolved NodeB eNB, area key information of an area in which the eNB is located and area key information of an adjacent area of the area in which the eNB is located.

In some embodiments, the sending, by the processor 1901, a related area key to a corresponding device by invoking the program code stored in the memory 1902 may specifically include:

receiving an area key request message sent by the eNB; and sending an area key response message to the eNB, where the area key response message includes the area key information of the area in which the eNB is located and the area key information of the adjacent area of the area in which the eNB is located.

In some embodiments, the sending, by the processor 1901, the area key to the first communications device by invoking the program code stored in the memory 1902 may specifically include:

receiving an area key request message sent by a mobility management entity MME, where the area key request message includes location information of user equipment UE; and sending, by the V2X server, an area key response message to the MME, where the area key response message includes area key information of an area corresponding to the location information of the UE and area key information of an adjacent area of the area.

In some embodiments, the sending, by the processor 1901, the area key to the first communications device by invoking the program code stored in the memory 1902 may specifically include:

establishing, to user equipment UE, a security connection of a generic bootstrapping architecture GBA or GBA push security mechanism;

receiving an area key request message sent by the UE, where the area key request message includes location information of the UE; and sending an area key response message to the UE, where the area key response message includes area key information of an area corresponding to the location information of the UE and area key information of an adjacent area of the area.

Figure 20:
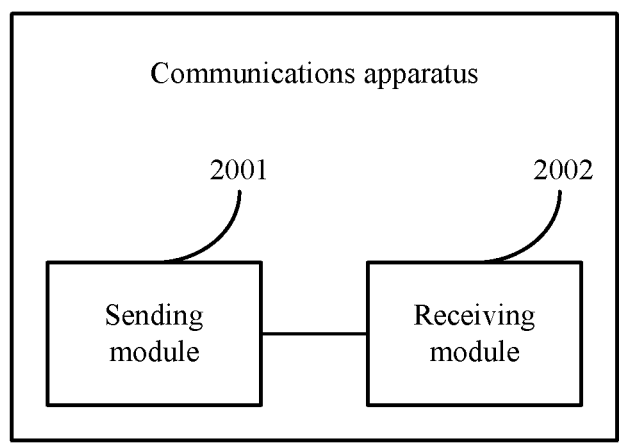
FIG. 20 is a schematic structural diagram of a communications apparatus according to an embodiment of the present invention.

Referring to FIG. 20, FIG. 20 is a schematic structural diagram of another communications apparatus according to an embodiment of the present invention. The communications apparatus may be applied to the UE in the foregoing method embodiments. As shown in FIG. 20, the communications apparatus may include:

a sending module 2001, configured to send an attach request message to an evolved NodeB eNB; and a receiving module 2002, configured to: receive a vehicle-to-everything V2X communication resource allocated by the eNB, where the V2X communication resource is allocated to the UE when the eNB receives indication information indicating that the UE is allowed to perform a V2X service; or receive an area key allocation message sent by a mobility management entity MME, where the area key allocation message is sent to the UE after the MME determines that the UE is allowed to perform the V2X service and the authentication on the UE successes, and the area key allocation message includes area key information of an area corresponding to location information of the UE and area key information of an adjacent area of the area.

In some embodiments, the receiving module 2002 may be specifically configured to receive an area key allocation message sent by the eNB, where the area key allocation message includes area key information of an area in which the eNB is located and area key information of an adjacent area of the area in which the eNB is located.

In some embodiments bodiment, the sending module is further configured to send an area key request message to the eNB; and the receiving module is further configured to receive an area key response message sent by the eNB, where the area key response message includes the area key information of the area in which the eNB is located and the area key information of the adjacent area of the area in which the eNB is located.

In some embodiments, the area key information includes a correspondence between an area key, an area key ID, and an area ID.

In some embodiments, the sending module 2001 may be specifically configured to send a V2X message to a receive end, where the V2X message includes message content, the area key ID, the area ID, and a message verification value, where the message verification value is obtained by performing, by using the area key corresponding to the area key ID and the area ID, integrity protection on the message content, the area key ID, and the area ID.

In some embodiments, the attach request message includes V2X indication information, where the V2X indication information is used to indicate that the UE is of a V2X type.

Figure 21:
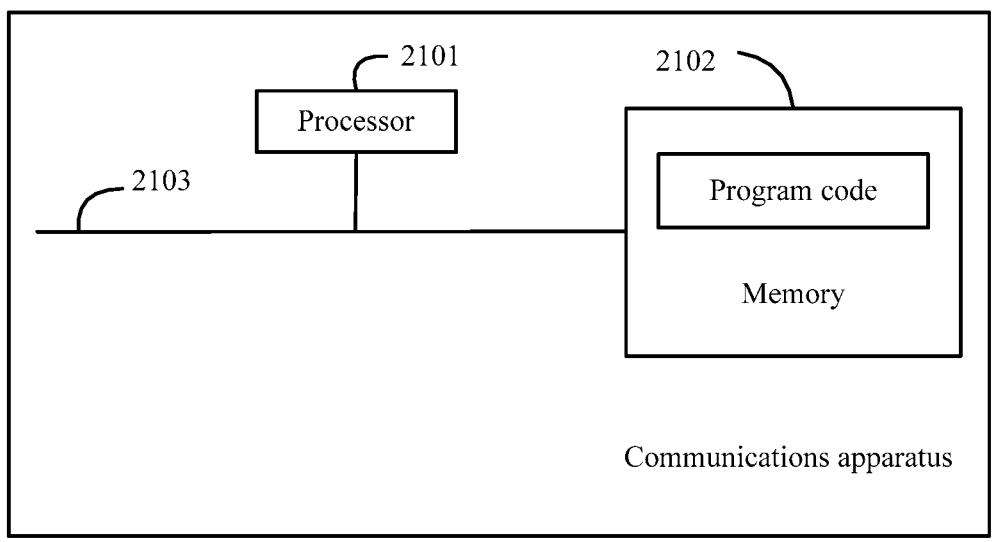
FIG. 21 is a schematic structural diagram of another communications apparatus according to an embodiment of the present invention.

Referring to FIG. 21, FIG. 21 is a schematic structural diagram of another communications apparatus according to an embodiment of the present invention. The communications apparatus shown in FIG. 21 may include a bus 2103, and a processor 2101 and a memory 2102 that are connected to the bus 2103. The memory 2102 stores program code. It may be understood by a person skilled in the art that a structure of the communications apparatus shown in the figure does not constitute a limitation on the present invention. The structure may be a bus structure or a star structure, and may include more or fewer components than those shown in the figure, or combine some components, or have a different component layout. In this embodiment of the present invention, the processor 2101 may perform the following operations by invoking the program code stored in the memory 2102:

sending an attach request message to an evolved NodeB eNB; and receiving a vehicle-to-everything V2X communication resource allocated by the eNB, where the V2X communication resource is allocated to the UE when the eNB receives indication information indicating that the UE is allowed to perform a V2X service; or receiving an area key allocation message sent by a mobility management entity MME, where the area key allocation message is sent to the UE after the MME determines that the UE is allowed to perform the V2X service and the authentication on the UE successes, and the area key allocation message includes area key information of an area corresponding to location information of the UE and area key information of an adjacent area of the area.

In some embodiments, the receiving, by the processor 2101 by invoking the program code stored in the memory 2102, a V2X communication resource allocated by the evolved NodeB eNB may specifically include:

receiving an area key allocation message sent by the eNB, where the area key allocation message includes area key information of an area in which the eNB is located and area key information of an adjacent area of the area in which the eNB is located.

In some embodiments, after the sending an attach request message to an evolved NodeB eNB, the operations further include:

sending an area key request message to the eNB; and receiving an area key response message sent by the eNB, where the area key response message includes area key information of an area in which the eNB is located and area key information of an adjacent area of the area in which the eNB is located.

In some embodiments, the area key information includes a correspondence between an area key, an area key ID, and an area ID.

In some embodiments, the processor 2101 may further perform the following operation by invoking the program code stored in the memory 2102:

sending a V2X message to a receive end, where the V2X message includes message content, the area key ID, the area ID, and a message verification value, where the message verification value is obtained by performing, by using the area key corresponding to the area key ID and the area ID, integrity protection on the message content, the area key ID, and the area ID.

In some embodiments, the attach request message includes V2X indication information, where the V2X indication information is used to indicate that the UE is of a V2X type.

Figure 22:
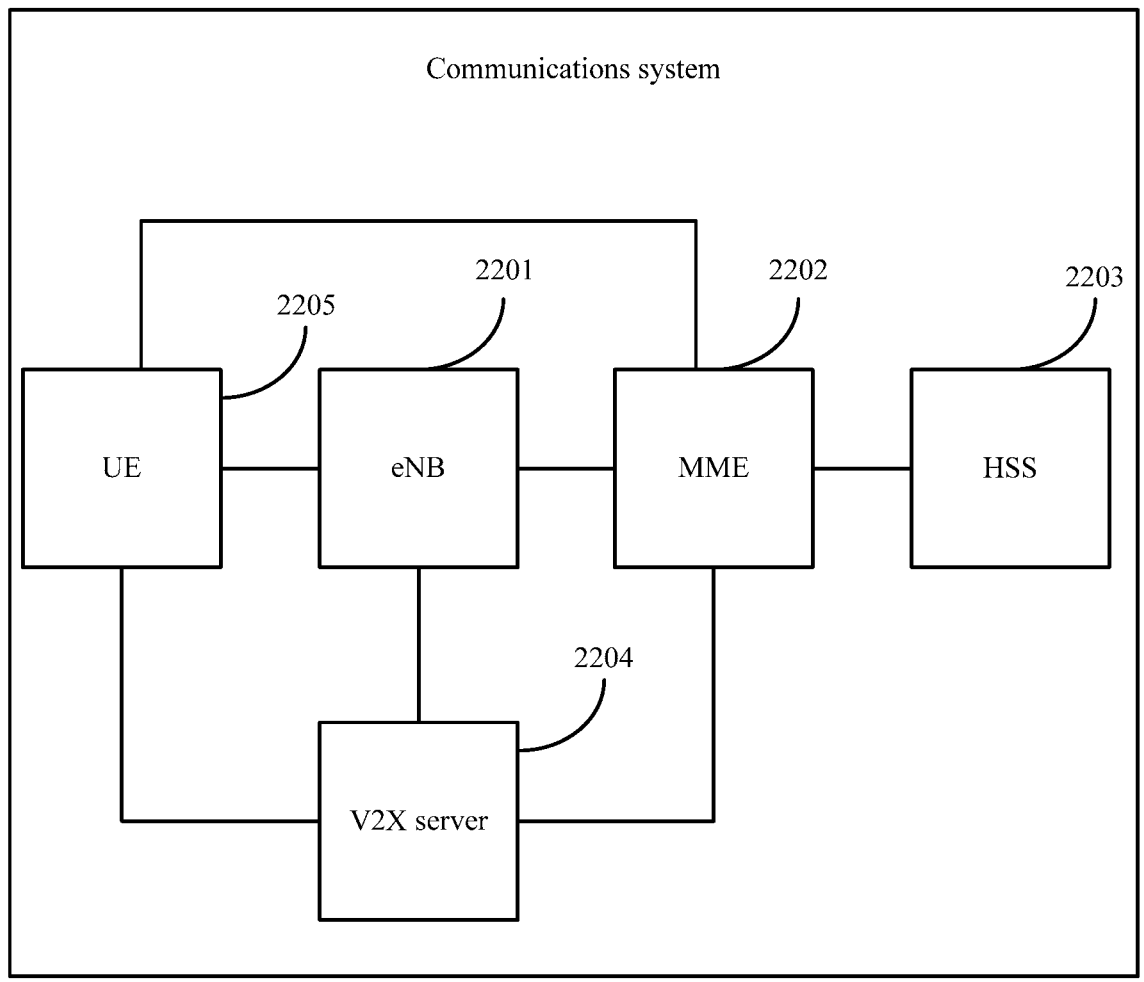
FIG. 22 is a schematic architectural diagram of a communications system according to an embodiment of the present invention.

Referring to FIG. 22, FIG. 22 is a schematic structural diagram of a communications system according to an embodiment of the present invention. As shown in FIG. 22, the communications system may include:

an eNB 2201, configured to send an attach request message to an MME, where the attach request message is used by UE to request to attach to a network, and the attach request message includes an identity of the UE;

the MME 2202, configured to receive the attach request message sent by the evolved NodeB eNB, and send, to a home subscriber server HSS according to the attach request message, an authentication data request message that includes the identity of the UE; and the HSS 2203, configured to perform authorization on the UE according to the identity of the UE, and send, to the MME, an authentication data response message that includes an authentication vector AV, where the authentication data response message indicates that the authorization on the UE succeeds, where the MME 2202 is further configured to determine, according to the authentication data response message, that the UE is allowed to perform a vehicle-to-everything V2X service, and perform authentication on the UE according to the AV.

In some embodiments, the communications system further includes:

a V2X server 2204, configured to generate an area key of an area in which a first communications device is located, and send the area key to the first communications device.

In some embodiments, the communications system further includes:

UE 2205, configured to send an attach request message to the eNB 2201, where the UE 2205 is further configured to: receive a V2X communication resource allocated by the eNB 2201, where the V2X communication resource is allocated to the UE 2205 when the eNB 2201 receives indication information indicating that the UE 2205 is allowed to perform the V2X service; or receive an area key allocation message sent by the MME 2202, where the area key allocation message is sent to the UE 2205 after the MME 2202 determines that the UE 2205 is allowed to perform the V2X service and the UE 2205 is authenticated by the MME 2202, and the area key allocation message includes area key information of an area corresponding to location information of the UE 2205 and area key information of an adjacent area of the area.

In some embodiments, the eNB 2201 may include the communications apparatus shown in any one of FIG. 12 to FIG. 14.

In some embodiments, the MME 2202 may include the communications apparatus shown in any one of FIG. 9 to FIG. 11.

In some embodiments, the HSS 2203 may include the communications apparatus shown in either FIG. 15 or FIG. 16.

In some embodiments, the V2X server 2204 may include the communications apparatus shown in any one of FIG. 17 to FIG. 19.

In some embodiments, the UE 2205 may include the communications apparatus shown in either FIG. 20 or FIG. 21.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. Specifically, it may be implemented by software plus necessary universal hardware. The universal hardware includes a universal integrated circuit, a universal CPU, a universal memory, a universal device, and the like. It definitely may also be implemented by application-specific hardware including an application-specific integrated circuit, an application-specific CPU, an application-specific memory, an application-specific device, and the like.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing describes in detail the communication method and the related apparatus that are provided in the embodiments of the present invention. This specification describes a principle and the implementations of the present invention by using specific examples. The foregoing embodiment descriptions are merely used to help understand the method of the present invention. In addition, a person of ordinary skill in the art may make modifications to the specific implementations and application scope according to the present invention. To sum up, content of this specification shall not be understood as a limitation on the present invention.

What is claimed is:

1. A communication method, comprising:
receiving, by a communication apparatus, a first attach request message from user equipment (UE);
sending, by the communication apparatus, a second attach request message to a mobility management entity according to the first attach request message;
receiving, by the communication apparatus, indication information from the mobility management entity, wherein the indication information indicates that the UE is allowed to perform a vehicle-to-everything (V2X) service; and
after the indication information is received, allocating, by the communication apparatus, a V2X communication resource to the UE according to the indication information, wherein allocating, by the communication apparatus, the V2X communication resource to the UE comprises:
sending, by the communication apparatus, an area key allocation message to the UE, wherein the area key allocation message comprises:
first area key information of an area in which the communication apparatus is located; and
second area key information of an adjacent area of the area in which the communication apparatus is located,
wherein security protection on a V2X communication message is performed using the first area key information.

2. The method according to claim 1, further comprising, before sending, by the communication apparatus, the area key allocation message to the UE:
sending, by the communication apparatus, an area key request message to a V2X server; and
receiving, by the communication apparatus, an area key response message from the V2X server, wherein the area key response message comprises the first area key information and the second area key information.

3. The method according to claim 1, wherein each of the first area key information and the second area key information indicates a correspondence between an area key, an area key ID, and an area ID.

4. The method according to claim 1, wherein the indication information is included in an initial context establishment request message;
after the communication apparatus receives the initial context establishment request message from the mobility management entity that includes the indication information indicating that the UE is allowed to perform the V2X service, the method further comprising:
establishing, by the communication apparatus, access stratum (AS) security context with the UE; and
sending, by the communication apparatus, an area key allocation message to the UE, wherein the area key allocation message is protected by using the AS security context.

5. A communication method, comprising:
sending, by user equipment (UE), an attach request message to a communication apparatus; and
receiving, by the UE, a vehicle-to-everything (V2X) communication resource allocated by the communication apparatus, wherein:
the V2X communication resource is allocated to the UE after the communication apparatus receives indication information from a mobility management entity indicating that the UE is allowed to perform a V2X service; and
receiving, by the UE the V2X communication resource allocated by the communication apparatus comprises:
receiving, by the UE, an area key allocation message from the communication apparatus, wherein the area key allocation message comprises:
first area key information of an area in which the communication apparatus is located; and
second area key information of an adjacent area of the area in which the communication is located.

6. The method according to claim 5, further comprising, after sending, by the UE, the attach request message to the communication apparatus:
sending, by the UE, an area key request message to the communication apparatus; and
receiving, by the UE, an area key response message from the communication apparatus, wherein the area key response message comprises a first area key information of an area in which the communication apparatus is located and a second area key information of an adjacent area of the area in which the communication apparatus is located.

7. The method according to claim 5, wherein each of the first area key information and the second area key information indicates a correspondence between an area key, an area key ID, and an area ID.

8. The method according to claim 7, further comprising:
sending, by the UE, a V2X message to a receive end, wherein the V2X message comprises message content, the area key ID, the area ID, and a message verification value, wherein the message verification value is obtained by performing, by using the area key corresponding to the area key ID and the area ID, integrity protection on the message content, the area key ID, and the area ID.

9. The method according to claim 5, wherein the attach request message comprises V2X indication information configured to indicate that the UE is of a V2X type.

10. A communications apparatus, comprising a processor and a memory coupled to the processor and configured to store program code, wherein the processor is configured to perform following steps by invoking the program code stored in the memory:
receiving a first attach request message from user equipment (UE);
sending a second attach request message to a mobility management entity according to the first attach request message, wherein
receiving indication information from the mobility management entity, wherein the indication information indicates that the UE is allowed to perform a vehicle-to-everything (V2X) service;
after the indication information is received, allocating a V2X communication resource to the UE according to the indication information indicating that the UE is allowed to perform the V2X service; and
sending an area key allocation message to the UE, wherein the area key allocation message comprises:
first area key information of an area in which the communication apparatus is located; and
second area key information of an adjacent area of the area in which the communication apparatus is located,
wherein security protection on a V2X communication message is performed using the first area key information.

11. The communications apparatus according to claim 10, wherein the steps further comprise:
sending an area key request message to a V2X server; and
receiving an area key response message from the V2X server, wherein the area key response message comprises the first area key information and the second area key information.

12. The communications apparatus according to claim 10, wherein each of the first area key information and the second area key information indicates a correspondence between an area key, an area key ID, and an area ID.

13. The communications apparatus according to claim 10, wherein the indication information indicating that the UE is allowed to perform the V2X service is included in an initial context establishment request message; and
the steps further comprise:
establishing access stratum (AS) security context with the UE; and
sending, to the UE, an area key allocation message that is protected by using the AS security context.

14. A communications apparatus, comprising a processor and a memory coupled to the processor and configured to store program code, wherein the processor is configured to perform following steps by invoking the program code stored in the memory:
sending an attach request message to a second communication apparatus;
receiving a vehicle-to-everything (V2X) communication resource allocated by the second communication apparatus, wherein the V2X communication resource is allocated to user equipment (UE) after the second communication apparatus receives indication information indicating that the UE is allowed to perform a V2X service; and receiving an area key allocation message from the communication apparatus, wherein the area key allocation message comprises:
- first area key information of an area in which the communication apparatus is located; and
- second area key information of an adjacent area of the area in which the communication apparatus is located.

15. The communications apparatus according to claim 14, wherein the steps further comprise:
- sending an area key request message to the second communication apparatus; and
- receiving an area key response message from the second communication apparatus, wherein the area key response message comprises first area key information of an area in which the communication apparatus is located and second area key information of an adjacent area of the area in which the communication apparatus is located.

16. The communications apparatus according to claim 14, wherein the attach request message comprises V2X indication information configured to indicate that the UE is of a V2X type.

* * * * *